United States Patent
Yamasaki et al.

(10) Patent No.: US 7,628,912 B2
(45) Date of Patent: Dec. 8, 2009

(54) MANUFACTURING DEVICE AND APPLICATION DEVICE FOR LIQUID CONTAINING MICRO-NANO BUBBLES

(75) Inventors: Kazuyuki Yamasaki, Hiroshima (JP); Kazuyuki Sakata, Fukuyama (JP); Kazumi Chuhjoh, Takamatsu (JP); Masaki Kataoka, Fukuyama (JP)

(73) Assignee: Sharp Kabushiki Kaisha, Osaka (JP)

( * ) Notice: Subject to any disclaimer, the term of this patent is extended or adjusted under 35 U.S.C. 154(b) by 272 days.

(21) Appl. No.: 11/896,542

(22) Filed: Sep. 4, 2007

(65) Prior Publication Data
US 2008/0264843 A1   Oct. 30, 2008

(30) Foreign Application Priority Data
Sep. 25, 2006   (JP) .............................. 2006-258446

(51) Int. Cl.
*C02F 3/00* (2006.01)
(52) U.S. Cl. .................. 210/150; 210/151; 210/745; 210/532.2; 210/167.21; 210/220
(58) Field of Classification Search ......... 210/150–151, 210/220, 745, 532.2, 167.21
See application file for complete search history.

(56) References Cited

U.S. PATENT DOCUMENTS

2006/0054205 A1   3/2006   Yabe et al.

FOREIGN PATENT DOCUMENTS

| JP | 2003-334548 | 11/2003 |
|---|---|---|
| JP | 2004-121962 | 4/2004 |
| JP | 2004-321959 | 11/2004 |
| JP | 2006193358 A | * 7/2006 |

* cited by examiner

*Primary Examiner*—Chester T Barry
(74) *Attorney, Agent, or Firm*—Nixon & Vanderhye, P.C.

(57) ABSTRACT

The application device for liquid containing micro-nano bubbles generates micro-nano bubbles in a wide size distribution with use of a submerged pump-type micro-nano bubble generator and a spiral flow-type micro-nano bubble generator. A micro-nano bubble generating aid metering pump is controlled by a bubble level meter and a level controller, so that the supply amount of a micro-nano bubble generating aid is controlled in response to the level of bubbles from a fluid level. The supply amount of a micro-nano bubble generating aid is also controlled by a turbidimeter and a controller in response to the turbidity of the liquid in a micro-nano bubble generation tank, while the amount of air supplied to the submerged pump-type micro-nano bubble generator is controlled in response to the turbidity of the liquid. Therefore, the device can produce a large amount of various micro-nano bubbles in a wide size distribution more economically.

19 Claims, 16 Drawing Sheets

US 7,628,912 B2

MANUFACTURING DEVICE AND APPLICATION DEVICE FOR LIQUID CONTAINING MICRO-NANO BUBBLES

CROSS REFERENCE OF RELATED APPLICATION

This nonprovisional application claims priority under 35 U.S.C. §119(a) on Patent Application No(s). 2006-258446 filed in Japan on Sep. 25, 2006, the entire contents of which are hereby incorporated by reference.

BACKGROUND OF THE INVENTION

The present invention relates to a manufacturing method for liquid containing micro-nano bubbles, a manufacturing device for liquid containing micro-nano bubbles, and an application device for liquid containing micro-nano bubbles. The present invention relates to a manufacturing method and a manufacturing device for liquid containing micro-nano bubbles for generating a large amount of micro-nano bubbles having a wide range of sizes with efficiency by using, for example, two kinds of micro-nano bubble generators. The present invention also relates to an application device for liquid containing micro-nano bubbles capable of producing liquid containing a large amount of micro-nano bubbles in a wide size distribution and applying them to various facilities so as to achieve considerable enhancement in performance of various facilities.

Conventionally, a method and a device for generating micro-nano bubbles by using one kind of micro-nano bubble generator have been proposed.

In such conventional technology, a method and a device for utilizing nano bubbles are shown in JP 2004-121962 A. This conventional technology utilizes such characteristics of nano bubbles as decrease in buoyancy, increase in surface area, increase in surface activity, generation of local high pressure fields, a surface active property and an antiseptic property attained by achievement of electrostatic polarization. More specifically, it has been disclosed that by associating these characteristics with each other, a fouling component adsorption function, a substance surface high-speed cleaning and an antiseptic function allow advanced cleaning of various substances with low environmental load as well as purification of contaminated water.

In another conventional technology, a nano bubble generation method is disclosed in JP 2003-334548 A. This technology includes step (1) for gasifying part of liquid by decomposition, step (2) for applying ultrasonic waves to liquids, or step (3) composed of a step for gasifying part of liquid by decomposition and a step for applying ultrasonic waves.

In yet another conventional technology, a waste fluid treatment device using ozone micro bubbles is disclosed in JP 2004-321959 A. In this technology, ozone gas generated by an ozonizer and waste liquid drawn from the bottom of a treatment tank are fed to a micro bubble generator through a pressurization pump. In this technology, it is also disclosed that the waste fluid in the treatment tank is aerated by the generated ozone micro bubbles sent from the opening of a gas blow-off pipe.

Now, in the micro-nano bubble generation method and the micro-nano bubble generator, it is required to manage the generation state of micro-nano bubbles so as to achieve the optimal state and to constantly maintain the optimal generation state so as to enhance the performance of various facilities. In the field using micro-nano bubbles, it is demanded that a large amount of various micro-nano bubbles in a wide size distribution should be produced more economically.

SUMMARY OF THE INVENTION

An object of the present invention is to provide a manufacturing method for liquid containing micro-nano bubbles, a manufacturing device for liquid containing micro-nano bubbles, and an application device for liquid containing micro-nano bubbles, which can produce a large amount of various micro-nano bubbles in a wide size distribution more economically.

In order to achieve the above object, there is provided a manufacturing method for liquid containing micro-nano bubbles, comprising the steps for:

generating micro-nano bubbles in liquid introduced into a micro-nano bubble generation tank by two or more kinds of micro-nano bubble generators different in performance placed inside the micro-nano bubble generation tank, the two or more kinds of the micro-nano bubble generators including a submerged pump-type micro-nano bubble generator and a non-submerged pump-type micro-nano bubble generator;

detecting level of bubbles from a fluid level of the liquid in the micro-nano bubble generation tank by a bubble level meter;

detecting turbidity of the liquid in the micro-nano bubble generation tank by a turbidimeter;

controlling a micro-nano bubble generating aid metering pump, which pumps a micro-nano bubble generating aid to the micro-nano bubble generation tank, based on a bubble level detection signal obtained from the bubble level meter so as to control an amount of the micro-nano bubble generating aid introduced into the micro-nano bubble generation tank;

controlling the micro-nano bubble generating aid metering pump based on a turbidity detection signal obtained from the turbidimeter so as to control an amount of the micro-nano bubble generating aid introduced into the micro-nano bubble generation tank; and controlling a blower which supplies air to the submerged pump-type micro-nano bubble generator based on the turbidity detection signal obtained from the turbidimeter so as to control an amount of air supplied to the submerged pump-type micro-nano bubble generator.

According to the manufacturing method for liquid containing micro-nano bubbles in the present invention, micro-nano bubbles having a wide size distribution can be generated by two or more kinds of micro-nano bubble generators including a submerged pump-type micro-nano bubble generator and a non-submerged pump-type micro-nano bubble generator. Since the supply amount of the micro-nano bubble generating aid is controlled in response to the level of bubbles from the fluid level in the micro-nano bubble generation tank, the generating efficiency of micro-nano bubbles can be enhanced. Since the supply amount of the micro-nano bubble generating aid is controlled in response to the turbidity of the liquid in the micro-nano bubble generation tank, the generating efficiency of micro-nano bubbles can be enhanced. Since the amount of air supplied to the submerged pump-type micro-nano bubble generator is controlled in response to the turbidity of the liquid in the micro-nano bubble generation tank, micro-nano bubbles can be generated economically.

Therefore, according to the present invention, it becomes possible to efficiently generate micro-nano bubbles in various sizes and to effectively utilize them in a next process device.

Also, there is provided a manufacturing device for liquid containing micro-nano bubbles, comprising:

a micro-nano bubble generation tank for receiving liquid, including a submerged pump-type micro-nano bubble generator, a non-submerged pump-type micro-nano bubble generator, a bubble level meter for detecting level of bubbles from a fluid level of the received liquid and a turbidimeter for detecting turbidity of the liquid;

a micro-nano bubble generating aid metering pump for pumping a micro-nano bubble generating aid to the micro-nano bubble generation tank;

a blower for supplying air to the submerged pump-type micro-nano bubble generator;

a first control section for controlling the micro-nano bubble generating aid metering pump based on a bubble level detection signal obtained from the bubble level meter so as to control an amount of the micro-nano bubble generating aid introduced into the micro-nano bubble generation tank;

a second control section for controlling the micro-nano bubble generating aid metering pump based on a turbidity detection signal obtained from the turbidimeter so as to control an amount of the micro-nano bubble generating aid introduced into the micro-nano bubble generation tank;

a third control section for controlling the blower based on the turbidity detection signal obtained from the turbidimeter so as to control an amount of air supplied to the submerged pump-type micro-nano bubble generator.

In the present embodiment, micro-nano bubbles having a wide size distribution can be generated by two or more kinds of micro-nano bubble generators including a submerged pump-type micro-nano bubble generator and a non-submerged pump-type micro-nano bubble generator. Since the micro-nano bubble generating aid metering pump is controlled by the bubble level meter and the first control section so that the supply amount of micro-nano bubble generating aid is controlled in response to the level of bubbles from the fluid level in the micro-nano bubble generation tank, the generating efficiency of micro-nano bubbles can be enhanced. Since the supply amount of the micro-nano bubble generating aid is controlled by the turbidimeter and the second control section in response to the turbidity of the liquid in the micro-nano bubble generation tank, the generating efficiency of micro-nano bubbles can be enhanced. Since the amount of air supplied to the submerged pump-type micro-nano bubble generator is controlled by the turbidimeter and the second control section in response to the turbidity of the liquid in the micro-nano bubble generation tank, micro-nano bubbles can be generated economically.

Therefore, according to the manufacturing device for liquid containing micro-nano bubbles of the present invention, it becomes possible to efficiently generate micro-nano bubbles in various sizes and to effectively utilize them in a next process device.

In one embodiment of the invention, an application device comprises: the manufacturing device for liquid containing micro-nano bubbles; and a next process device for receiving liquid containing micro-nano bubbles obtained from the manufacturing device for liquid containing micro-nano bubbles.

In the application device for liquid containing micro-nano bubbles in the present embodiment, the micro-nano bubbles in various sizes, which were efficiently generated in the manufacturing device for liquid containing micro-nano bubbles, can be made to effectively act in the step in the next process device.

In one embodiment of the invention, an application device comprises: the manufacturing device for liquid containing micro-nano bubbles; and a septic tank for receiving liquid containing micro-nano bubbles obtained from the manufacturing device for liquid containing micro-nano bubbles.

In the application device for liquid containing micro-nano bubbles in the present embodiment, the micro-nano bubbles in various sizes, which were generated efficiently in the manufacturing device for liquid containing micro-nano bubbles, are introduced into the septic tank to activate microorganisms therein so that the treatment capacity of the septic tank can be enhanced.

In one embodiment of the invention the next process device is a biological treatment device.

In the application device for liquid containing micro-nano bubbles in the present embodiment, the micro-nano bubbles in various sizes, which were generated efficiently in the manufacturing device for liquid containing micro-nano bubbles, are introduced into the biological treatment device to activate microorganisms therein so that the treatment capacity of the septic tank can be enhanced.

In one embodiment of the invention, the next process device is a chemical treatment device.

In the application device for liquid containing micro-nano bubbles in the present embodiment, the micro-nano bubbles in various sizes, which were efficiently generated in the manufacturing device for liquid containing micro-nano bubbles, are introduced into the chemical treatment device, where chemical reactions such as oxidization can be promoted.

In one embodiment of the invention, the next process device is a physical treatment device.

In the application device for liquid containing micro-nano bubbles in the present embodiment, micro-nano bubbles in various sizes are efficiently generated so that physical phenomena, such as filtration by a submerged membrane in the physical treatment device, can efficiently be induced.

In one embodiment of the invention, the micro-nano bubble generation tank includes: a first micro-nano bubble generation section; a second micro-nano bubble generation section; and a divider plate for dividing the first micro-nano bubble generation section and the second micro-nano bubble generation section.

In the present embodiment, aggregate of two kinds of micro-nano bubbles having a size distribution different from each other can be produced in the first and second micro-nano bubble generation sections.

In one embodiment of the invention, the manufacturing device further comprises: a first micro-nano bubble generating aid metering pump for pumping a micro-nano bubble generating aid to the first micro-nano bubble generation section; a first bubble level meter for detecting level of bubbles in the first micro-nano bubble generation section; a first micro-nano bubble generating aid amount control section for controlling the micro-nano bubble generating aid metering pump based on a bubble level detection signal obtained from the first bubble level meter so as to control an amount of the micro-nano bubble generating aid introduced into the first micro-nano bubble generation section; a second micro-nano bubble generating aid metering pump for pumping a micro-nano bubble generating aid to the second micro-nano bubble generation section; a second bubble level meter for detecting level of bubbles in the second micro-nano bubble generation section; and a second micro-nano bubble generating aid amount control section for controlling the micro-nano bubble generating aid metering pump based on a bubble level detection signal obtained from the second bubble level meter so as to control an amount of the micro-nano bubble generating aid introduced into the second micro-nano bubble generation section.

In the present embodiment, the first and second micro-nano bubble generating aid metering pumps, the first and second bubble level meters, and the first and second micro-nano bubble generating aid amount control sections can independently control the first and second micro-nano bubble generation sections, thereby allowing automatic generation of optimal micro-nano bubbles.

Since micro-nano bubbles are generated in two steps, a large amount of micro-nano bubbles in a wide size distribution can be generated. Especially when the micro-nano bubble generator is placed on an upstream side which generates micro-nano bubbles relatively large in size though large in amount, while the micro-nano bubble generator is placed on a downstream side which generates micro-nano bubbles small in size though small in amount, various micro-nano bubbles can be generated efficiently.

In one embodiment of the invention, an application device comprising: the manufacturing device for liquid containing micro-nano bubbles; and a useful microorganism tank for receiving liquid containing micro-nano bubbles obtained from the manufacturing device for liquid containing micro-nano bubbles.

In the present embodiment, the liquid containing micro-nano bubbles flowing from the manufacturing device for the liquid containing micro-nano bubbles is introduced into the useful microorganism tank, so that the microorganisms in the useful microorganism tank are activated and thereby the efficiency of treatment by useful microorganisms can be enhanced while the quantity and the quality of products by the useful microorganisms can be increased as compared with the conventional device.

In one embodiment of the invention, an application device for liquid containing micro-nano bubbles comprising: the manufacturing device for liquid containing micro-nano bubbles; and a fermentation tank for receiving liquid containing micro-nano bubbles obtained from the manufacturing device for liquid containing micro-nano bubbles.

In the application device for liquid containing micro-nano bubbles in this embodiment, the liquid containing micro-nano bubbles flowing from the manufacturing device for the liquid containing micro-nano bubbles is introduced into the fermentation tank, so that the microorganisms in the fermentation tank are activated and thereby fermentation can efficiently be carried out in a short period of time while the quantity and the quality of fermentation products are improved as compared with the conventional device.

In one embodiment of the invention, an application device for liquid containing micro-nano bubbles comprising: the manufacturing device for liquid containing micro-nano bubbles; and a hydroponics tank for receiving liquid containing micro-nano bubbles obtained from the manufacturing device for liquid containing micro-nano bubbles.

In the application device for liquid containing micro-nano bubbles in the present embodiment, the liquid containing micro-nano bubbles flowing from the manufacturing device for the liquid containing micro-nano bubbles is introduced into the hydroponics tank, so that reduction of cultivation time in hydroponics and the effect of increasing the size of target plants for hydroponics are implemented. Moreover, the disinfection effect by micro-nano bubbles brings about the effect of preventing pathogenic bacteria, which may be generated in a water culture medium in the conventional device, from being bred.

In one embodiment of the invention, an application device for liquid containing micro-nano bubbles comprising: the manufacturing device for liquid containing micro-nano bubbles; and an aquiculture tank for receiving liquid containing micro-nano bubbles obtained from the manufacturing device for liquid containing micro-nano bubbles.

In the application device for liquid containing micro-nano bubbles in the present embodiment, the liquid containing micro-nano bubbles flowing from the manufacturing device for the liquid containing micro-nano bubbles is introduced into the aquiculture tank, so that the culturing period of target culture products can be reduced. Moreover, the disinfection effect by micro-nano bubbles brings about the effect of preventing pathogenic bacteria, which may be generated in the culture tank in the conventional device, from being bred. That is, the device implements the effect of providing culture subjects with resistance to disease.

In one embodiment of the invention, an application device for liquid containing micro-nano bubbles comprising: the manufacturing device for liquid containing micro-nano bubbles; and an activated sludge tank for receiving liquid containing micro-nano bubbles obtained from the manufacturing device for liquid containing micro-nano bubbles.

In the present embodiment, the liquid containing micro-nano bubbles flowing from the manufacturing device for the liquid containing micro-nano bubbles is introduced into the activated sludge tank, so that the microorganisms in the activated sludge are activated and thereby the treatment capacity of the activated sludge can be enhanced. Moreover, treatment with the microorganisms activated by micro-nano bubbles improves the water quality of treated water.

In one embodiment of the invention, an application device for liquid containing micro-nano bubbles, comprising: the manufacturing device for liquid containing micro-nano bubbles; and an industrial water pretreatment tank for receiving liquid containing micro-nano bubbles obtained from the manufacturing device for liquid containing micro-nano bubbles.

In the present embodiment, since the liquid containing micro-nano bubbles flowing from the manufacturing device for the liquid containing micro-nano bubbles is introduced into the industrial water pretreatment tank, the microorganisms which propagate in the industrial water pretreatment tank are activated, so that trace organic matter in the industrial water can be treated with the microorganisms and thereby the water quality of the industrial water is improved.

In one embodiment of the invention, an application device for liquid containing micro-nano bubbles, comprising: the manufacturing device for liquid containing micro-nano bubbles; and a cleaning tank for receiving liquid containing micro-nano bubbles obtained from the manufacturing device for liquid containing micro-nano bubbles.

In the present embodiment, since the liquid containing micro-nano bubbles flowing from the manufacturing device for the liquid containing micro-nano bubbles is introduced into the cleaning tank, cleaning in the cleaning tank will be powerfully promoted.

In one embodiment of the invention, the submerged pump-type micro-nano bubble generator is placed in the first micro-nano bubble generation section, while the non-submerged pump-type micro-nano bubble generator is placed in the second micro-nano bubble generation section, and wherein the first micro-nano bubble generation section is placed upstream from the second micro-nano bubble generation section.

In the manufacturing device for liquid containing micro-nano bubbles in the present embodiment, a submerged pump-type micro-nano bubble generator is placed in the first micro-nano bubble generation section serving as an upstream tank, while a non-submerged pump-type micro-nano bubble generator is placed in the second micro-nano bubble generation section serving as a downstream tank. Therefore, the upstream submerged pump-type micro-nano bubble generator and the downstream non-submerged pump-type micro-nano bubble generator can respectively generate micro-nano bubbles in various sizes different in size distribution.

In one embodiment of the invention, the micro-nano bubble generating aid is household detergent.

In the present embodiment, since the micro-nano bubble generating aid is household detergent put on the market, it can easily be available at low cost, and can easily be decomposed by various microorganisms after use.

In one embodiment of the invention, an application device for liquid containing micro-nano bubbles, comprising: the manufacturing device for liquid containing micro-nano bubbles; and a buried duct for receiving liquid containing micro-nano bubbles obtained from the manufacturing device for liquid containing micro-nano bubbles.

In the present embodiment, the liquid containing the micro-nano bubbles in various sizes different in size distribution coming from the manufacturing device for liquid containing micro-nano bubbles is introduced into the buried duct. Therefore, micro-nano bubbles continuously exist in the liquid to prevent water in the buried duct from turning into an anaerobic state, which in turn may prevent the water from generating hydrogen sulfide derived from residual matter, thereby making it possible to prevent corrosion of the buried duct. It is assumed that the corrosion of the buried duct be attributed to hydrogen sulfide.

In one embodiment of the invention, an application device for liquid containing micro-nano bubbles, comprising: the manufacturing device for liquid containing micro-nano bubbles; and a building water drainage facility and a building water supply facility for receiving liquid containing micro-nano bubbles obtained from the manufacturing device for liquid containing micro-nano bubbles.

In the present embodiment, since micro-nano bubbles continuously exist in water for a long period of time, the detergent action and disinfection action by the water containing micro-nano bubbles allow cleaning and disinfection of building water drainage facility and building water supply facility, so that the maintenance costs of the building water drainage facility and the building water supply facility can be reduced substantially.

According to the manufacturing method for liquid containing micro-nano bubbles in the present invention, micro-nano bubbles having a wide size distribution can be generated by two or more kinds of micro-nano bubble generators including a submerged pump-type micro-nano bubble generator and a non-submerged pump-type micro-nano bubble generator. Since the supply amount of the micro-nano bubble generating aid is controlled in response to the level of bubbles from the fluid level in the micro-nano bubble generation tank, the generating efficiency of micro-nano bubbles can be enhanced. Since the supply amount of the micro-nano bubble generating aid is controlled in response to the turbidity of the liquid in the micro-nano bubble generation tank, the generating efficiency of micro-nano bubbles can be enhanced. Since the amount of air supplied to the submerged pump-type micro-nano bubble generator is controlled in response to the turbidity of the liquid in the micro-nano bubble generation tank, micro-nano bubbles can be generated economically.

Therefore, according to the present invention, it becomes possible to efficiently generate micro-nano bubbles in various sizes and to effectively utilize them in a next process device.

BRIEF DESCRIPTION OF THE DRAWINGS

The present invention will become more fully understood from the detailed description given hereinbelow and the accompanying drawings which are given by way of illustration only, and thus are not intended to limit the present invention, and wherein.

DETAILED DESCRIPTION OF THE INVENTION

Hereinbelow, the present invention will be described in details in conjunction with the embodiments with reference to the drawings.

First Embodiment

Figure 1:
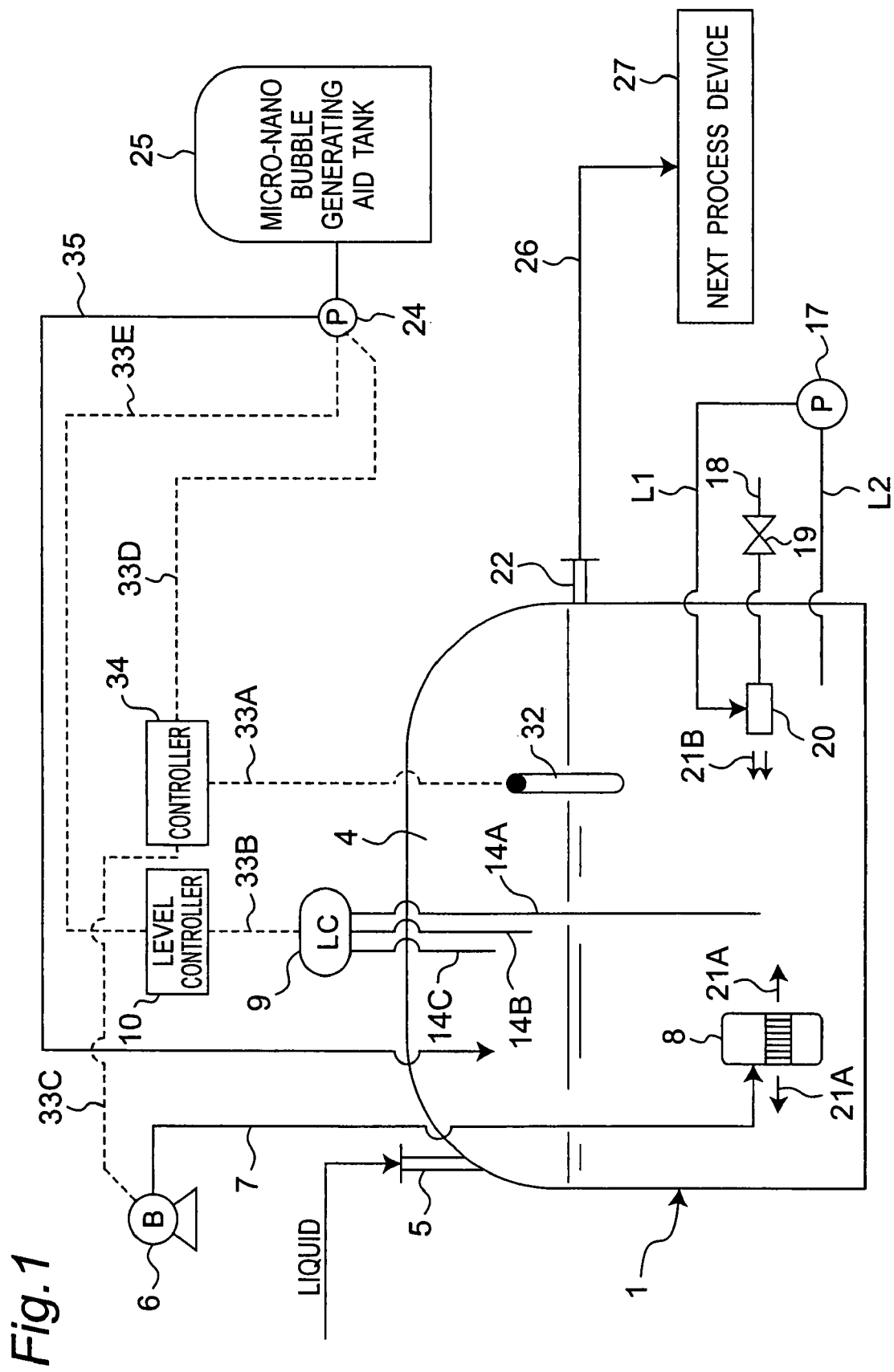
FIG. 1 is a schematic view showing a first embodiment of an application device for liquid containing micro-nano bubbles in the present invention.

FIG. 1 is a schematic view showing an application device for liquid containing micro-nano bubbles as a first embodiment of the present invention. This application device for liquid containing micro-nano bubbles is mainly composed of a micro-nano bubble generation tank 1 and a next process device 27.

This micro-nano bubble generation tank 1 is a tank made of various materials. The material of the tank may be selected depending on the character of liquid, from materials such as plastic, stainless steel, and vinyl chloride.

In the micro-nano bubble generation tank 1, a submerged pump-type micro-nano bubble generator 8 and a non-submerged pump type (spiral flow type) micro-nano bubble generator 20 are placed to generate water streams 21A and 21B, respectively.

Also in the micro-nano bubble generation tank 1, three electrodes 14A, 14B, and 14C connected to a electrode terminal section 9, and a turbidimeter 32 are placed. The electrode terminal section 9 and three electrodes 14A, 14B, and 14C constitute a bubble level meter.

The turbidimeter 32 is placed in the micro-nano bubble generation tank 1 in order to observe, with use of a measuring instrument, the state that micro-nano bubbles are generated in the liquid in the micro-nano bubble generation tank 1.

That is, when a large amount of micro-nano bubbles are generated in the liquid in the tank, the liquid tends to go white and its turbidity tends to rise. Therefore, when a large amount of micro-nano bubbles are generated, a turbidity detection signal outputted by the turbidimeter 32 indicates a high value. If micro-nano bubbles generated in the liquid in the tank is not enough, the turbidity tends to fall. Therefore, when the generated amount of micro-nano bubbles is small, the turbidity detection signal outputted by the turbidimeter 32 indicates a low value.

In the application device for liquid containing micro-nano bubbles of the present embodiment, liquid flows into the micro-nano bubble generation tank 1 from an inflow line 5.

Air is supplied to the submerged pump-type micro-nano bubble generator 8 from a blower 6 connected through an air line 7. The submerged pump-type micro-nano bubble generator 8 cuts the air supplied from the blower 6 through high velocity rotation and generates micro bubbles. Some of the micro bubbles then contract and turn into micro-nano bubbles. The submerged pump-type micro-nano bubble generator 8 generates water stream 21A by discharging the micro-nano bubbles.

A turbidity detection signal outputted by the turbidimeter 32 is transmitted to a controller 34 via a signal line 33A, and the rotation speed of the electric motor in the blower 6 is controlled based on a control signal outputted by the controller 34 to a signal line 33C, by which the amount of air discharged by the blower 6 is controlled. Thus, the optimal amount of air is supplied to the submerged pump-type micro-nano bubble generator 8. With the optimal amount of air, the submerged pump-type micro-nano bubble generator 8 generates optimal micro-nano bubbles.

More specifically, if the value of the turbidimeter 32 is lower than a predetermined value, then it means that the amount of the micro-nano bubbles generated by the submerged pump-type micro-nano bubble generator 8 is small. Therefore, in this case, the controller 34 controls so as to increase the rotation speed of the electric motor in the blower 6 and to generate more micro-nano bubbles so that the numerical value of turbidity expressed by the turbidity detection signal from the turbidimeter 32 becomes high.

In the case where the numerical value of turbidity expressed by the turbidity detection signal from the turbidimeter 32 is higher than a predetermined value, it means that micro-nano bubbles are sufficiently generated in the liquid in the micro-nano bubble generation tank 1. Therefore, in this case, the controller 34 decreases the rotation speed of the electric motor in the blower 6 to implement energy-saving operation, and the submerged pump-type micro-nano bubble generator 8 operates in the state that micro-nano bubbles have sufficiently been generated in the liquid in the tank.

Since micro-nano bubbles are sufficiently generated when the numerical value of turbidity on the turbidity detection signal outputted by the turbidimeter 32 is higher than a predetermined value, the controller 34 may control so as to decrease the rotation speed of the electric motor in a micro-nano bubble generating aid metering pump 24 with a control signal outputted to a signal line 33D in order to decrease the added amount of a micro-nano bubble generating aid introduced into the micro-nano bubble generation tank 1 via a pipe 35 from a micro-nano bubble generating aid tank 25. Controlling the added amount is useful for reducing running costs. Here, the controller 34 functions as second and third control sections.

When the height of bubbles (bubble level) from the fluid level of the liquid in the micro-nano bubble generation tank 1 is close to the water surface, that is, when the bubble level is low, a middle electrode 14B among three electrodes 14A, 14B, and 14C, which constitute a bubble level meter, is put in a current passing state with the presence of bubbles. In this case, the level controller 10 connected to the electrode 14B via the electrode terminal section 9 through a signal line 33B controls so as to increase the rotation speed of the electric motor in the micro-nano bubble generating aid metering pump 24 by outputting a control signal to a signal line 33E. Consequently, the amount of the micro-nano bubble generating aid introduced into the micro-nano bubble generation tank 1 from the micro-nano bubble generating aid tank 25 via the pipe 35 is increased. As a result, more bubbles are to be generated in the liquid in the tank.

It is to be noted that the longest electrode 14A on the right-hand side in FIG. 1 is a ground electrode. Without sensing the water level, two remaining electrodes 14B and 14C sense the bubble level. In FIG. 1, reference numeral 4 denotes a space section above the fluid level.

On the contrary, when the bubble level from the fluid level of the liquid in the micro-nano bubble generation tank 1 considerably goes up from the water surface, that is, when the bubble level is high, the shortest electrode 14C among three electrodes 14A-14C is put in the current passing state with respect to the fluid level with the presence of bubbles. In this case, a signal from the electrode 14C is transmitted to the level controller 10 from the signal line 33B via the electrode terminal section 9. In response to the signal, the level controller 10 controls so as to decrease the rotation speed of the electric motor in the micro-nano bubble generating aid metering pump 24 by outputting a control signal to the signal line 33E. By this control, the amount of the micro-nano bubble generating aid introduced from the micro-nano bubble generating aid tank 25 into the micro-nano bubble generation tank 1 via the pipe 35 is decreased, and thereby the amount of bubbles produced on the fluid level of the liquid in the tank is decreased.

It is to be noted that the micro-nano bubble generating aid includes various surfactants and various alcohols, which may be selected depending on purposes.

The non-submerged pump type (spiral flow type) micro-nano bubble generator 20 is in cooperation with a circulating pump 17 through pipes L1 and L2, so that high-pressure circulating water is supplied to the micro-nano bubble generator 20 by the circulating pump 17. In the non-submerged pump type (spiral flow type) micro-nano bubble generator 20, an air inlet pipe 18 for drawing air and a needle valve 19 for adjusting the amount of air are placed. The high-pressure circulating water and air are supplied to the micro-nano bubble generator 20 by the circulating pump 17 and air inlet pipe 18, by which micro-nano bubbles are generated by the micro-nano bubble generator 20.

Now, it is known that the micro-nano bubbles generated by the non-submerged pump type (spiral flow type) micro-nano bubble generator 20 are smaller than the micro-nano bubbles generated by the submerged pump-type micro-nano bubble generator 8. Therefore, slightly larger micro-nano bubbles are first produced by the submerged pump-type micro-nano bubble generator 8, among two micro-nano bubble generators 8 and 20 having different performance placed in the application device for liquid containing micro-nano bubbles in the first embodiment. Then, the liquid containing these slightly larger micro-nano bubbles is introduced into the non-submerged pump type (spiral flow type) micro-nano bubble generator 20, which generates more nano bubbles among micro-nano bubbles. The finer the bubbles become, the longer they exist in liquid to exert more effective action.

In this way, a sufficient amount of the micro-nano bubbles in a wide size distribution are added to the liquid, and then, the liquid containing micro-nano bubbles which flowed from an outflow line 22 passes through an outlet pipe 26 and is introduced into the next process device 27. Since the liquid containing micro-nano bubbles contains a large amount of micro-nano bubbles of the sizes demanded in the micro-nano bubble generating aid tank next process device 27, the micro-nano bubbles powerfully act in the next process device 27.

The next process device 27 includes various devices in the industrial field and applicability of the device for liquid containing micro-nano bubbles is wide. In this first embodiment, the application device for liquid containing micro-nano bubbles is embodied by the combination of the micro-nano bubble generation tank 1 and the next process device 27.

It is to be noted that commercially available devices by any manufacturers can be adopted as the submerged pump-type micro-nano bubble generator 8. Herein, by way of a concrete example, a device by Nomura Electronics Co., Ltd. was adopted. Also by way of a concrete example, a product by Nanoplanet Research Institute Corporation was adopted as the non-submerged pump type (spiral flow type) micro-nano bubble generator 20. It is to be noted that as the non-submerged pump type (spiral flow type) micro-nano bubble generator 20, there are other available products by other manufacturers, which may be selected depending on purposes. In the present embodiment, although one submerged pump-type micro-nano bubble generator 8 and one micro-nano bubble generator (spiral flow type) 20 were provided, two or more submerged pump-type micro-nano bubble generators and two or more spiral flow type micro-nano bubble generators may be provided.

Description is now given of four kinds of bubbles.
(i) Normal bubbles (air bubbles) ascend in water, and upon reaching the surface, they burst with a pop and disappear.
(ii) Micro bubbles are bubbles with an air bubble diameter of 10 to several dozen μm. Micro bubbles change to "micro-nano bubbles" with their contraction movements after generation.
(iii) Micro-nano bubbles are air bubbles having a diameter of 10 μm to around several hundred nm. The micro-nano bubbles can be described as the bubbles with the micro bubbles and the nano bubbles mixed together.
(iv) Nano bubbles are air bubbles having a diameter of several hundred nm or less.

Second Embodiment

Figure 2:
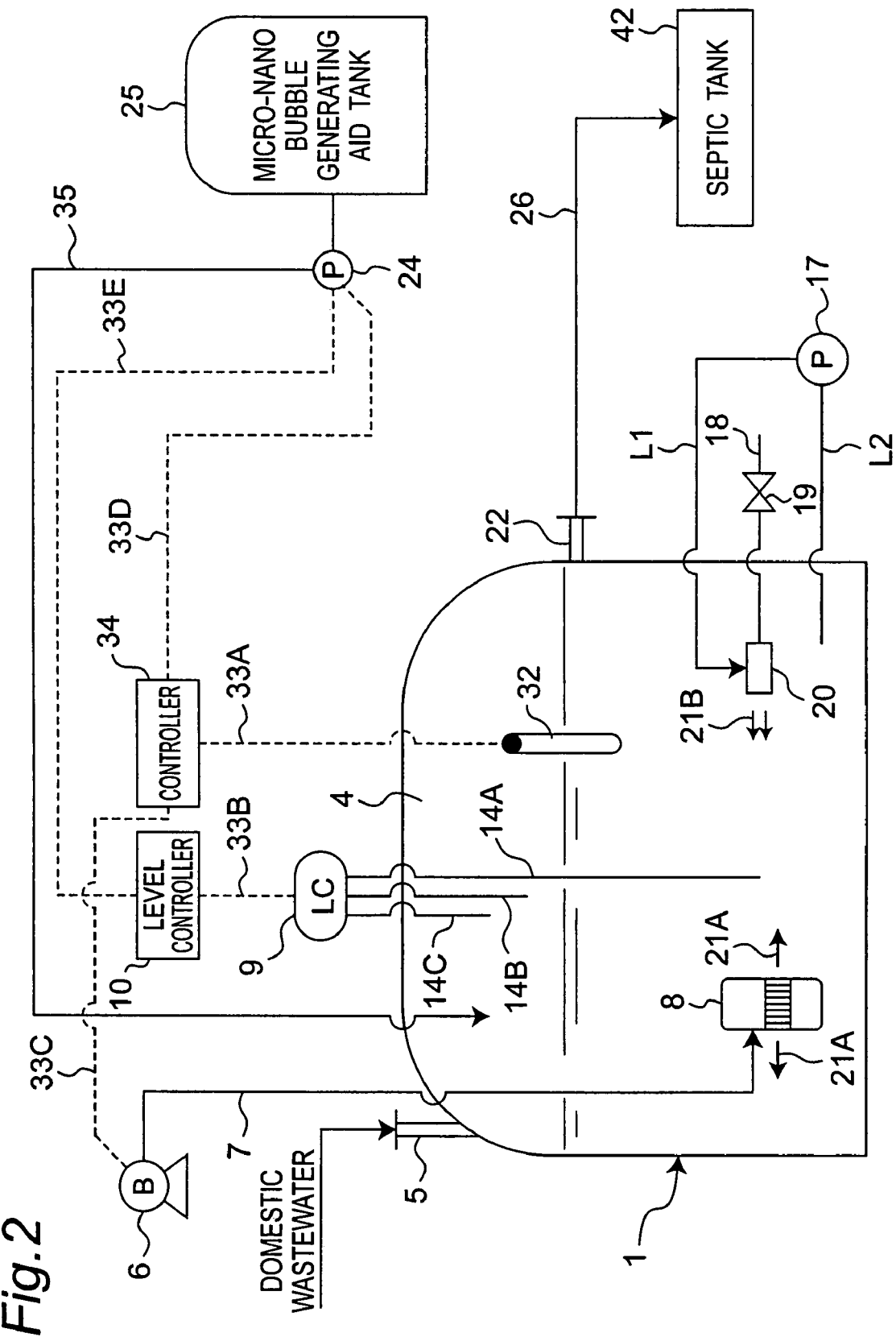
FIG. 2 is a schematic view showing a second embodiment of an application device for liquid containing micro-nano bubbles in the present invention.

Next, FIG. 2 shows an application device for liquid containing micro-nano bubbles which is a second embodiment of the present invention. The second embodiment is different from the above-mentioned first embodiment in the point that the liquid introduced into the micro-nano bubble generation tank 1 is replaced with domestic wastewater. The second embodiment is also different from the above-mentioned first embodiment in the point that the next process device 27 is replaced with a septic tank 42. Therefore, in this second embodiment, component members identical to those in the first embodiment are designated by identical reference numerals, and description will mainly be given of the portions different from the first embodiment.

In the second embodiment, the liquid containing micro-nano bubbles is, more specifically, domestic wastewater containing micro-nano bubbles which is introduced into the septic tank 42. That is, domestic wastewater is introduced into the micro-nano bubble generation tank 1. Then, an optimum amount of surfactant is added to the micro-nano bubble generation tank 1 by the micro-nano bubble generating aid metering pump 24, and micro-nano bubbles are effectively generated in the micro-nano bubble generation tank 1 to produce domestic wastewater containing micro-nano bubbles.

The domestic wastewater sufficiently containing micro-nano bubbles is introduced into the septic tank 42, and the micro-nano bubbles contained in the domestic wastewater activate microorganisms propagating in the septic tank 42 so that effective microbial treatment is performed on the domestic wastewater.

Introducing domestic wastewater containing micro-nano bubbles into the septic tank 42 as in the second embodiment implements the following effects (1)-(5).
(1) Foaming in the septic tank 42, if exists, decreases.
(2) Sludge i.e., microorganisms in the septic tank 42, is activated and the water quality of treated water can be enhanced.
(3) Offensive odor from the septic tank 42 decreases.
(4) The quality of treated water by the septic tank 42 is stabilized.
(5) Oxidization of ammoniacal nitrogen in the septic tank 42 progresses amazingly.

It should naturally be understood that instead of the septic tank 42, the next process device may serve as a combined household wastewater treatment facility, agricultural community drainage facility, and sewage treatment facility, which receive wastewater not totally the same as the wastewater treated in the septic tank 42 but relatively similar thereto.

Third Embodiment

Figure 3:
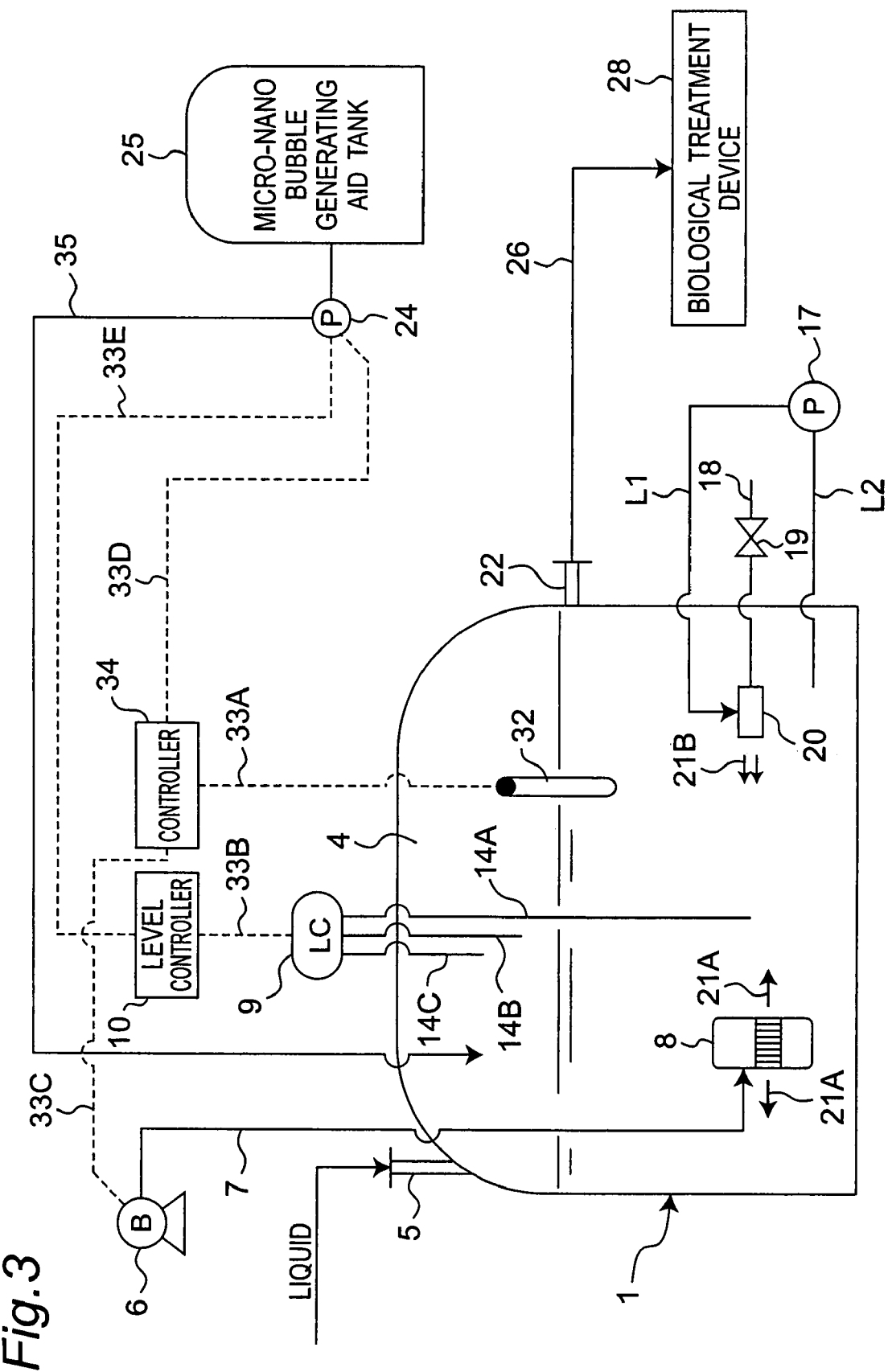
FIG. 3 is a schematic view showing a third embodiment of an application device for liquid containing micro-nano bubbles in the present invention.

Next, FIG. 3 shows an application device for liquid containing micro-nano bubbles which is a third embodiment of the present invention. The third embodiment is different from the first embodiment in the point that the next process device 27 of the above-mentioned first embodiment is replaced with a biological treatment device 28. Therefore, in this third embodiment, component members identical to those in the first embodiment are designated by identical reference numerals, and description will mainly be given of the portions different from the first embodiment.

In the third embodiment, the liquid containing micro-nano bubbles from the micro-nano bubble generation tank 1 is more specifically introduced into a biological treatment device 28. In this third embodiment, liquid is introduced into the micro-nano bubble generation tank 1, and then only an optimum amount of surfactant is added to the micro-nano bubble generation tank 1 by the micro-nano bubble generating aid metering pump 24.

The liquid containing micro-nano bubbles which was produced by effectively generating micro-nano bubbles in the micro-nano bubble generation tank 1 sufficiently contains micro-nano bubbles having an extensive size distribution. The liquid sufficiently containing the micro-nano bubbles having an extensive size distribution is introduced into the biological treatment device 28. In the biological treatment device 28, the micro-nano bubbles contained in the liquid activate microorganisms propagating in the biological treatment device 28, and thereby effectively progress a biological reaction in the biological treatment device 28.

In the third embodiment, introducing the liquid containing micro-nano bubbles into the biological treatment device 28 implements the following effects (1)-(4).

(1) Reaction time in the biological treatment device 28 can be reduced.
(2) Foaming in the biological treatment device 28, if exists, decreases.
(3) Microorganisms in the biological treatment device 28 are activated, which makes it possible to achieve increase in the amount of reactants and improvement in quality.
(4) Offensive odor from the biological treatment device 28 decreases.

Fourth Embodiment

Figure 4:
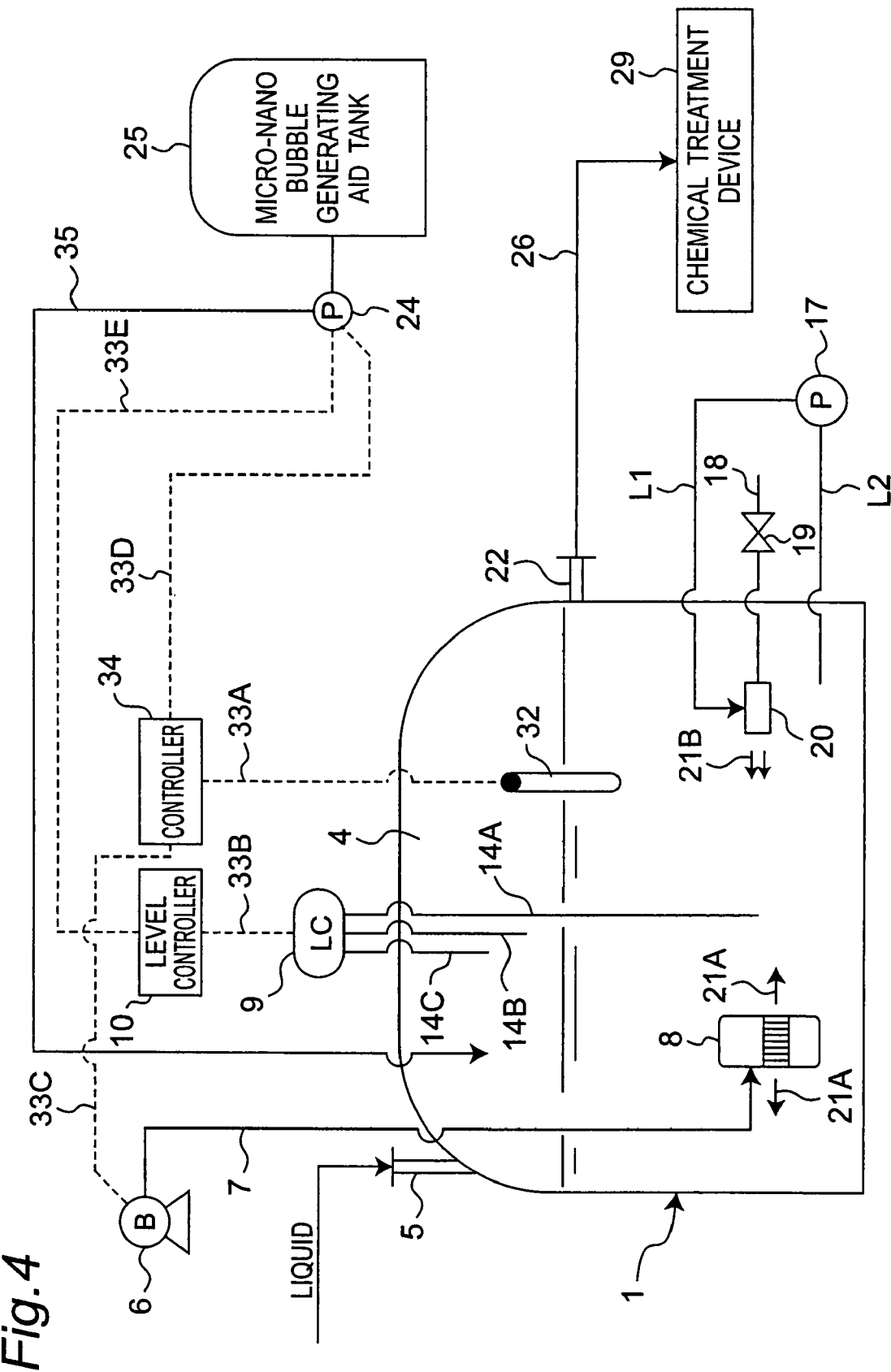
FIG. 4 is a schematic view showing a fourth embodiment of an application device for liquid containing micro-nano bubbles in the present invention.

Next, FIG. 4 shows an application device for liquid containing micro-nano bubbles which is a fourth embodiment of the present invention. The fourth embodiment is different from the first embodiment in the point that the next process device 27 of the above-mentioned first embodiment is replaced with a chemical treatment device 29. Therefore, in this fourth embodiment, component members identical to those in the first embodiment are designated by identical reference numerals, and description will mainly be given of the portions different from the first embodiment.

More specifically, in this fourth embodiment, liquid containing micro-nano bubbles is introduced into the chemical treatment device 29. In this fourth embodiment, liquid is introduced into the micro-nano bubble generation tank 1, and then only an optimum amount of surfactant is added to the micro-nano bubble generation tank 1 by the micro-nano bubble generating aid metering pump 24. Consequently, micro-nano bubbles are effectively generated in the micro-nano bubble generation tank 1 to produce liquid containing micro-nano bubbles. The liquid sufficiently containing micro-nano bubbles is introduced from the micro-nano bubble generation tank 1 into the chemical treatment device 29, and the micro-nano bubbles contained in the liquid effectively progress a chemical reaction in the chemical treatment device 29.

Introducing the liquid containing micro-nano bubbles into the chemical treatment device 29 as in the fourth embodiment implements the following effects (1)-(3).

(1) The chemical treatment device 29, which have conventionally suffered poor reaction efficiency in some cases, is able to improve the reaction efficiency with the liquid containing micro-nano bubbles.
(2) Foaming in the chemical treatment device 29, if exists, decreases.
(3) Offensive odor from the chemical treatment device 29 decreases.

Fifth Embodiment

Figure 5:
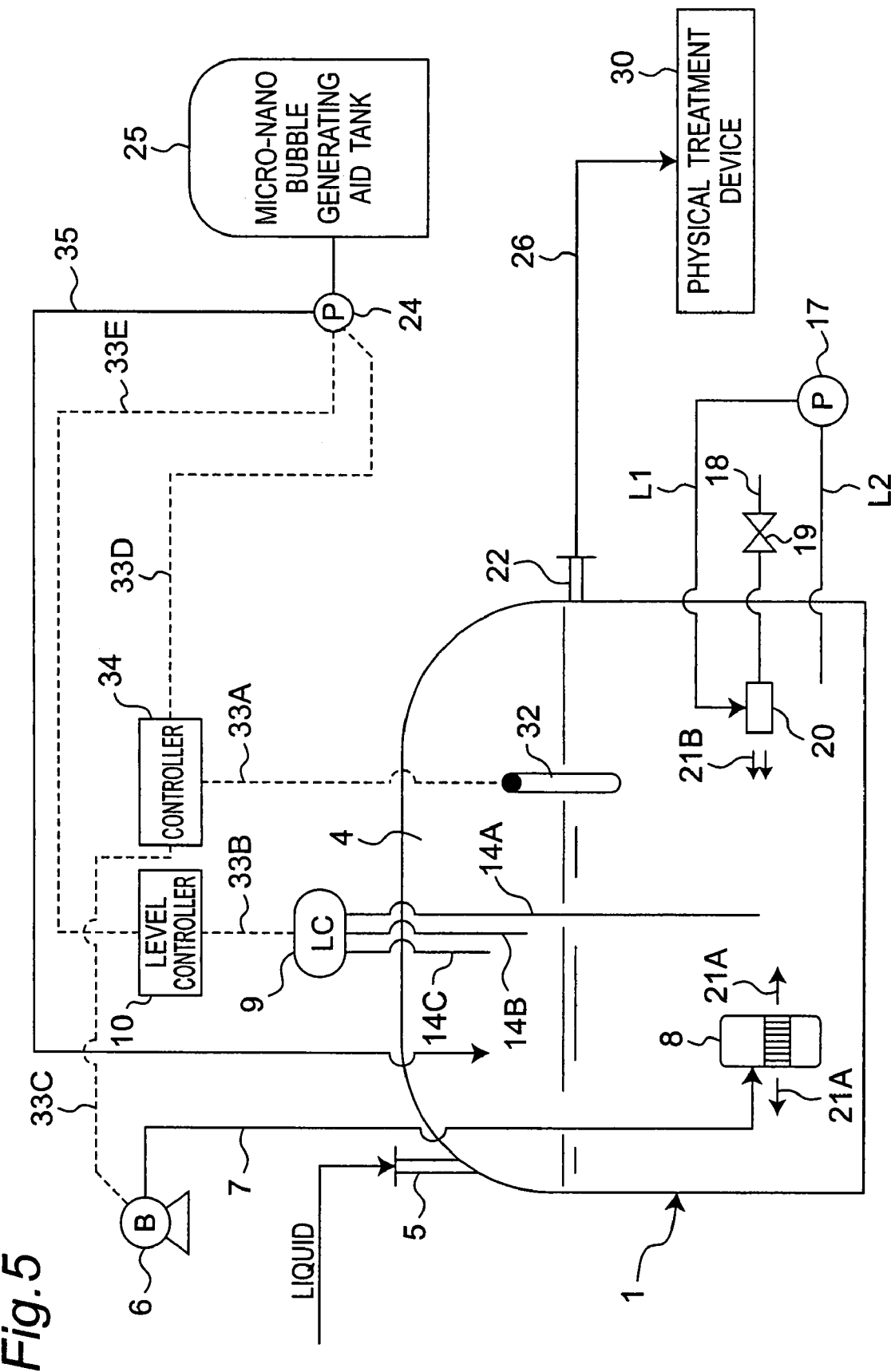
FIG. 5 is a schematic view showing a fifth embodiment of an application device for liquid containing micro-nano bubbles in the present invention.

Next, FIG. 5 shows an application device for liquid containing micro-nano bubbles which is a fifth embodiment of the present invention. The fifth embodiment is different from the first embodiment in the point that the next process device 27 of the above-mentioned first embodiment is replaced with a physical treatment device 30. Therefore, in this fifth embodiment, component members identical to those in the first embodiment are designated by identical reference numerals, and description will mainly be given of the portions different from the first embodiment.

In the fifth embodiment, liquid containing micro-nano bubbles is introduced into the physical treatment device 30. In this fifth embodiment, liquid is introduced into the micro-nano bubble generation tank 1, and then only an optimum amount of surfactant is added to the micro-nano bubble generation tank 1 by the micro-nano bubble generating aid metering pump 24. Consequently, micro-nano bubbles are effectively generated in the micro-nano bubble generation tank 1 to produce liquid containing micro-nano bubbles. The liquid sufficiently containing micro-nano bubbles is introduced from the micro-nano bubble generation tank 1 into the physical treatment device 30, and the micro-nano bubbles contained in the liquid effectively progress physical reaction treatment in the physical treatment device 30. For example, the micro-nano bubble liquid has following effects (1)-(4) for unit operation, such as filtration and adsorption, as physical reaction treatment.

(1) Regarding the reaction in the physical treatment device 30, effective progress of filtration and adsorption have conventionally been disturbed by physical clogging and other causes. However, the micro-nano bubble liquid made it possible to solve the problem in physical unit operation by avoiding occurrence of physical clogging.
(2) In the case where the physical treatment by the physical treatment device 30 was filtration, avoidance of clogging was a challenge. This challenge has been solved by the cleaning effect by micro-nano bubbles.
(3) The physical unit operation in the physical treatment device 30 is carried out easily.
(4) Offensive odor from the physical treatment device 30 decreases.

Sixth Embodiment

Figure 6:
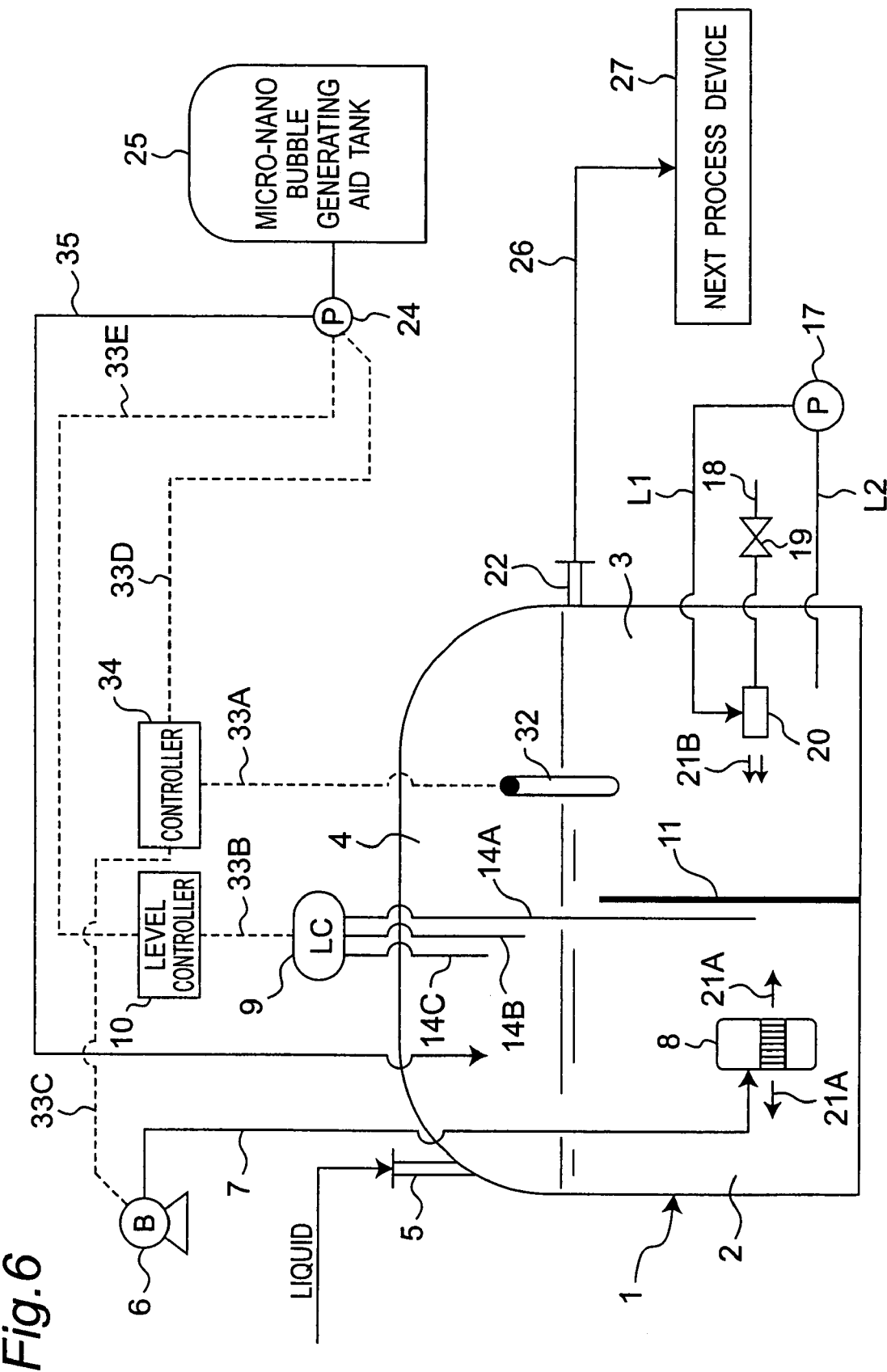
FIG. 6 is a schematic view showing a sixth embodiment of an application device for liquid containing micro-nano bubbles in the present invention.

Next, FIG. 6 shows an application device for liquid containing micro-nano bubbles which is a sixth embodiment of the present invention. The sixth embodiment is different from the above-mentioned first embodiment in the structure inside the micro-nano bubble generation tank 1 according to the first embodiment. More specifically, the sixth embodiment is different from the above-mentioned first embodiment in the point that a partition wall 11 is placed inside the micro-nano bubble generation tank 1 to divide the inside of the micro-nano bubble generation tank 1 into two sections. Therefore, in this sixth embodiment, component members identical to those in the first embodiment are designated by identical reference numerals, and description will mainly be given of the portions different from the first embodiment.

As shown in FIG. 6, in the sixth embodiment, the micro-nano bubble generation tank 1 is divided into a first micro-nano bubble generation section 2 and a second micro-nano bubble generation section 3 by the partition wall 11. A submerged pump-type micro-nano bubble generator 8 is present in the first micro-nano bubble generation section 2, while a non-submerged pump type (spiral flow type) micro-nano bubble generator 20 is present in the second micro-nano bubble generation section 3.

In the sixth embodiment, a micro-nano bubble generating aid stored in a micro-nano bubble generating aid tank 25 is added only to the first micro-nano bubble generation section 2 by the micro-nano bubble generating aid metering pump 24 so as to achieve efficient generation of micro-nano bubbles in the first micro-nano bubble generation section 2.

In the sixth embodiment, the introduced liquid is first introduced into the first micro-nano bubble generation section 2 by the placement of the partition wall 11 in the tank 1. Then, a micro-nano bubble generating aid is further added to the liquid introduced into the first micro-nano bubble generation section 2 by the micro-nano bubble generating aid metering pump 24. Then, the submerged pump-type micro-nano bubble generator 8 is operated in conjunction with the introduction of the liquid into the tank 1, by which micro-nano bubbles are efficiently generated in the liquid in the tank 1.

Next, in the first micro-nano bubble generation section 2, the liquid primarily containing micro-nano bubbles is then introduced into the second micro-nano bubble generation section 3 by overflow from the separation wall 11.

And in the second micro-nano bubble generation section 3, in conjunction with the introduction of the liquid, the non-submerged pump type (spiral flow type) micro-nano bubble generator 20 is operated together with a circulating pump 17, so as to generate micro-nano bubbles still finer than the micro-nano bubbles generated in the first micro-nano bubble generation section 2.

That is, it is already known that the non-submerged pump type (spiral flow type) micro-nano bubble generator 20 generates micro-nano bubbles smaller than those by the submerged pump-type micro-nano bubble generator 8. Therefore, two kinds of micro-nano bubble generators having such specification have been selected. More specifically, first, the first micro-nano bubble generation section 2 primarily produces micro-nano bubbles large in bubble size. Next, the second micro-nano bubble generation section 3 secondarily produces finer micro-nano bubbles. With the combination of the primary micro-nano-bubble generation and the secondary micro-nano-bubble generation, finer micro-nano bubbles can be produced in a large amount.

It is to be noted that the second micro-nano bubble generation section 3 is also equipped with a turbidimeter 32 in the sixth embodiment. The controller 34 controls the electric motor rotation speed of the micro-nano bubble generating aid metering pump 24 with a turbidity detection signal from the turbidimeter 32 so as to control the amount of a micro-nano bubble generating aid added to the micro-nano bubble generation tank 1 to be an appropriate amount. More specifically, when micro-nano bubbles are generated properly in the liquid in the micro-nano bubble generation tank 1, the liquid is clouded like milk. Therefore, the turbidimeter 32 can detect the developmental state of micro-nano bubbles, and so the developmental state of micro-nano bubbles can be controlled by equipment (such as controller 34) associated with the turbidimeter 32.

In the sixth embodiment, the liquid containing a large amount of micro-nano bubbles obtained from the micro-nano bubble generation tank 1 is introduced into a next process device 27 via a pipe 26 from an outflow line 22, by which the original actions of the micro-nano bubbles contained in the liquid as mentioned above are to be demonstrated.

Seventh Embodiment

Figure 7:
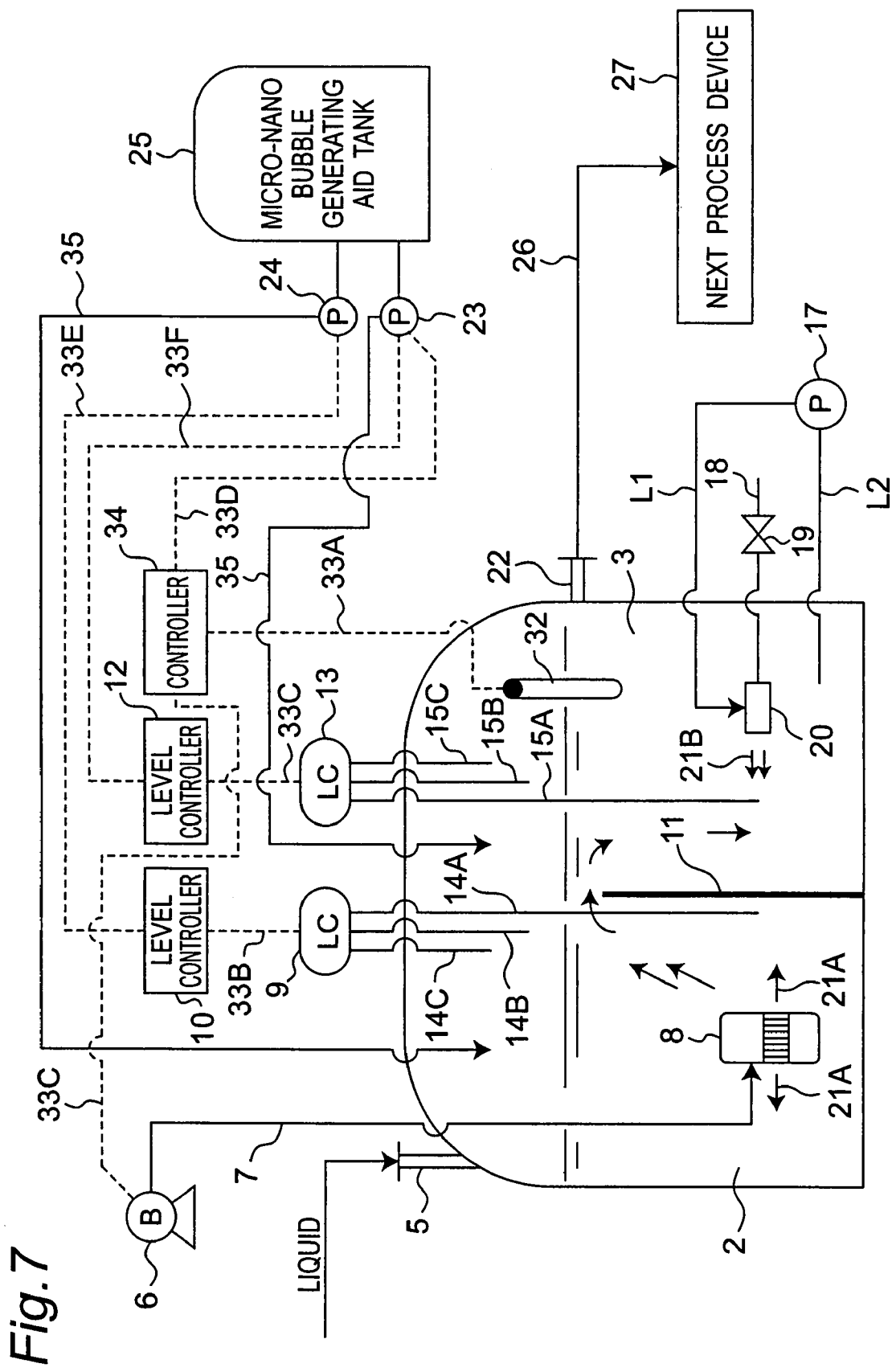
FIG. 7 is a schematic view showing a seventh embodiment of an application device for liquid containing micro-nano bubbles in the present invention.

Next, FIG. 7 shows an application device for liquid containing micro-nano bubbles which is a seventh embodiment of the present invention. The seventh embodiment is different from the above-mentioned first embodiment in the structure inside the micro-nano bubble generation tank 1 according to the first embodiment. Therefore, in this seventh embodiment, component members identical to those in the first embodiment are designated by identical reference numerals, and description will mainly be given of the portions different from the first embodiment.

More specifically, the seventh embodiment is different from the above-mentioned first embodiment in the following points (i)-(iv).

(i) A partition wall 11 is placed inside the micro-nano bubble generation tank 1 to divide the micro-nano bubble generation tank 1 into two sections, that is, a micro-nano bubble generation section 2 and a micro-nano bubble generation section 3.

(ii) There are provided a first micro-nano bubble generating aid metering pump 24 for adding a micro-nano bubble generating aid to the first micro-nano bubble generation section 2, and a second micro-nano bubble generating aid metering pump 23 for adding a micro-nano bubble generating aid to the second micro-nano bubble generation section 3.

(iii) There are provided electrodes 14A, 14B, and 14C and a electrode terminal section 9 which constitute a first bubble level meter for detecting the bubble level in the first micro-nano bubble generation section 2, and electrodes 15A, 15B, and 15C and a electrode terminal section 33 which constitutes a second bubble level meter for detecting the bubble level in the second micro-nano bubble generation section 3.

(iv) There are provided a level controller 10 as a first micro-nano bubble generating aid amount control section, and a level controller 12 as a second micro-nano bubble generating aid amount control section.

The level controller 10 controls the first micro-nano bubble generating aid metering pump 24 based on a bubble level detection signal obtained from the first bubble level meter so as to control the amount of the micro-nano bubble generating aid introduced into the first micro-nano bubble generation section 2. Also the level controller 12 controls the second micro-nano bubble generating aid metering pump 23 based on a bubble level detection signal obtained from the second bubble level meter so as to control the amount of the micro-nano bubble generating aid introduced into the second micro-nano bubble generation section 3.

Thus, in the seventh embodiment, the micro-nano bubble generating aid metering pumps 24 and 23 are provided which respectively correspond to the first and second micro-nano bubble generation sections 2 and 3 in the micro-nano bubble generation tank 1. Consequently, by adding micro-nano bubble generating aid to each of the micro-nano bubble generation sections 2 and 3, micro-nano bubbles are efficiently generated in each of the micro-nano bubble generation sections 2 and 3. That is, in the seventh embodiment, the liquid is first introduced into the first micro-nano bubble generation section 2. Then, a micro-nano bubble generating aid is further added to the liquid introduced into the first micro-nano bubble generation section 2 by a micro-nano bubble generating aid pump 24. Then, the submerged pump-type micro-nano bubble generator 8 is operated in conjunction with the introduction of the liquid, by which micro-nano bubbles are efficiently generated in the first micro-nano bubble generation section 2.

Next, the liquid primarily containing micro-nano bubbles in the first micro-nano bubble generation section 2 is then introduced into the second micro-nano bubble generation section 3 beyond the separation wall 11 by overflow.

Then, in the second micro-nano bubble generation section 3, a micro-nano bubble generating aid is added by the second micro-nano bubble generating aid metering pump 23. In conjunction with the introduction of the liquid, the non-submerged pump type (spiral flow type) micro-nano bubble generator 20 is operated together with a circulating pump 17, and still finer micro-nano bubbles are generated.

It is already known that the non-submerged pump type (spiral flow type) micro-nano bubble generator 20 generates micro-nano bubbles smaller than those by the submerged pump-type micro-nano bubble generator 8. Therefore, two kinds of micro-nano bubble generators of such specification have been selected. More specifically, first, the submerged pump-type micro-nano bubble generator 8 primarily produces micro-nano bubbles large in bubble size, and next, the non-submerged pump type (spiral flow type) micro-nano bubble generator 20 secondarily produces finer micro-nano bubbles.

In the seventh embodiment, with the combination of the primary micro-nano-bubble generation and the secondary micro-nano-bubble generation, finer micro-nano bubbles can be produced in a large amount.

It is to be noted that the second micro-nano bubble generation section 3 is equipped with a turbidimeter 32 in the seventh embodiment. The controller 34 controls the electric motor rotation speed of the micro-nano bubble generating aid metering pump 23 with a turbidity detection signal from the turbidimeter 32 so as to control the amount of a micro-nano bubble generating aid added to the second micro-nano bubble generation section 3 via a pipe 35 to be an appropriate amount. More specifically, when micro-nano bubbles are generated properly in the liquid in the micro-nano bubble generation tank 1, the liquid is clouded like milk. Therefore, the turbidimeter 32 can detect the developmental state of micro-nano bubbles, and so the developmental state of micro-nano bubbles can be controlled by equipment (such as controller 34) associated with the turbidimeter 32.

In the seventh embodiment, the liquid containing a large amount of micro-nano bubbles obtained from the micro-nano bubble generation tank 1 is introduced into a next process device 27 via a pipe 26 from an outflow line 22, by which the original actions of the micro-nano bubbles contained in the liquid as mentioned above are to be demonstrated.

Eighth Embodiment

Figure 8:
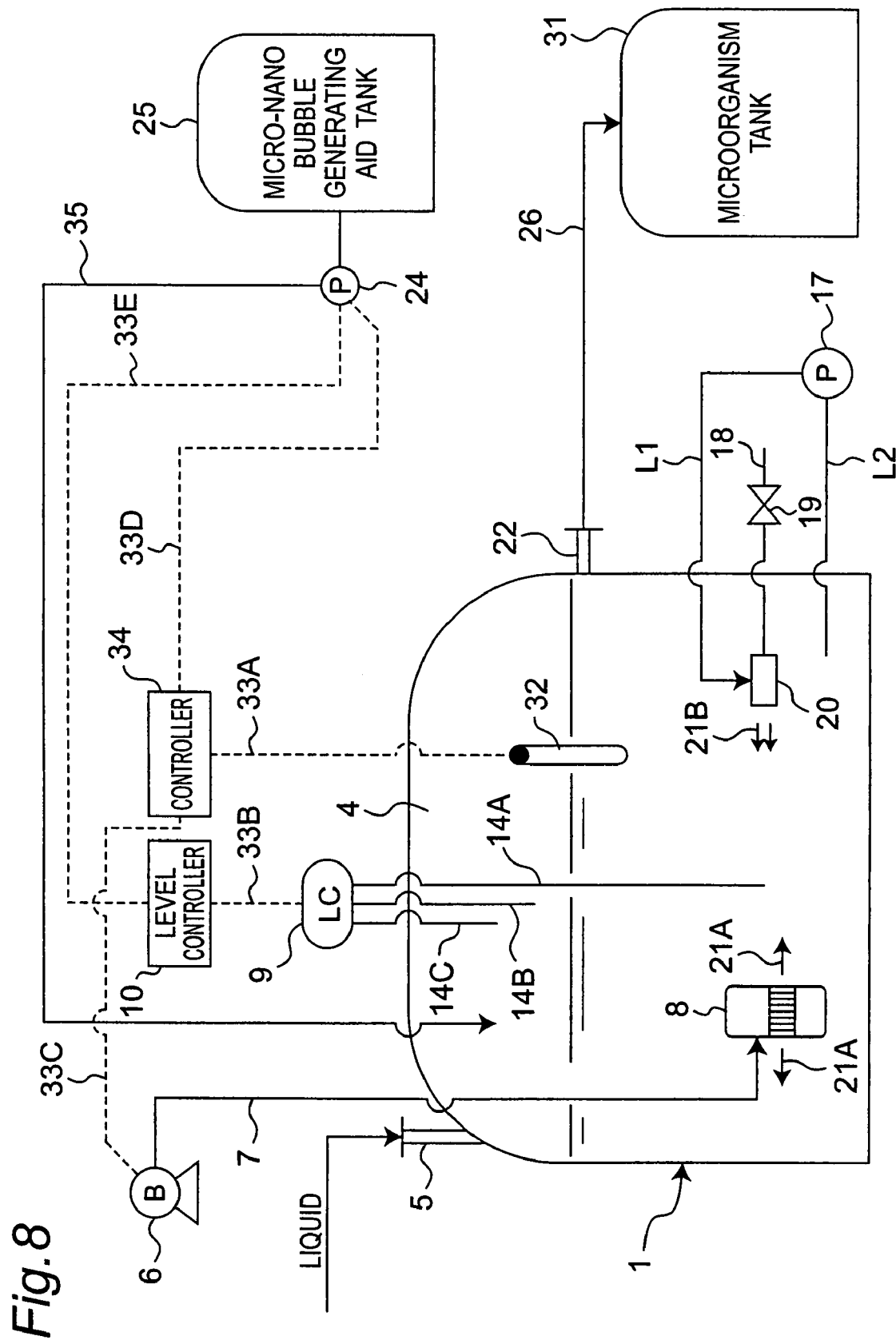
FIG. 8 is a schematic view showing an eighth embodiment of an application device for liquid containing micro-nano bubbles in the present invention.

Next, FIG. 8 shows an application device for liquid containing micro-nano bubbles which is an eighth embodiment of the present invention. The eighth embodiment is different from the first embodiment in the point that the next process device 27 in the above-mentioned first embodiment is replaced with a more specific useful microorganism tank 31. Therefore, in this eighth embodiment, component members identical to those in the first embodiment are designated by identical reference numerals, and description will mainly be given of the portions different from the first embodiment.

Since the next process device 27 in the first embodiment is replaced with the useful microorganism tank 31 in the eighth embodiment, useful microorganisms are activated by a large amount of micro-nano bubbles in the useful microorganism tank 31, so that the treatment efficiency by useful microorganisms can be enhanced while the amount and quality of products by the useful microorganisms can be enhanced.

It is to be noted that typical examples of the useful microorganism tank 31 include a manufacturing tank for antibiotic substances in pharmaceutical production.

Ninth Embodiment

Figure 9:
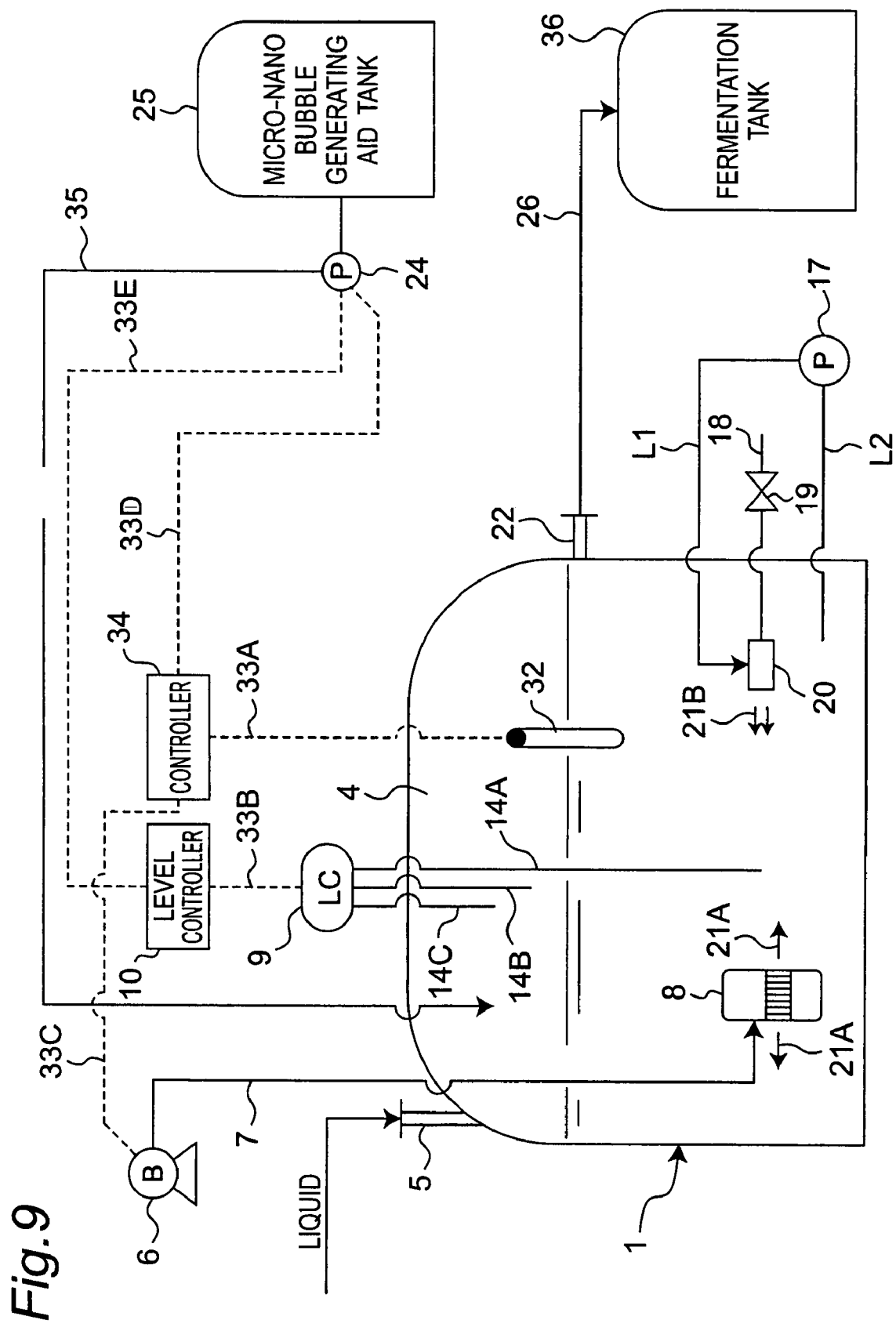
FIG. 9 is a schematic view showing a ninth embodiment of an application device for liquid containing micro-nano bubbles in the present invention.

Next, FIG. 9 shows an application device for liquid containing micro-nano bubbles which is a ninth embodiment of the present invention. The ninth embodiment is different from the first embodiment in the point that the next process device 27 in the above-mentioned first embodiment is replaced with a more specific fermentation tank 36. Therefore, in this ninth embodiment, component members identical to those in the first embodiment are designated by identical reference numerals, and description will mainly be given of the portions different from the first embodiment.

In the ninth embodiment, the next process device 27 in the first embodiment is replaced with a fermentation tank 36, so that the microorganisms in the fermentation tank 36 are activated by a large amount of micro-nano bubbles contained in the liquid introduced from the micro-nano bubble generation tank 1. Consequently, fermentation can be performed efficiently in a short time as compared with the conventional device, while the amount and quality of fermentation products can be enhanced.

It is to be noted that the fermentation tank 36 is typified by a fermentation tank for use in production of beer, wine, Japanese grain liquor and sake.

Tenth Embodiment

Figure 10:
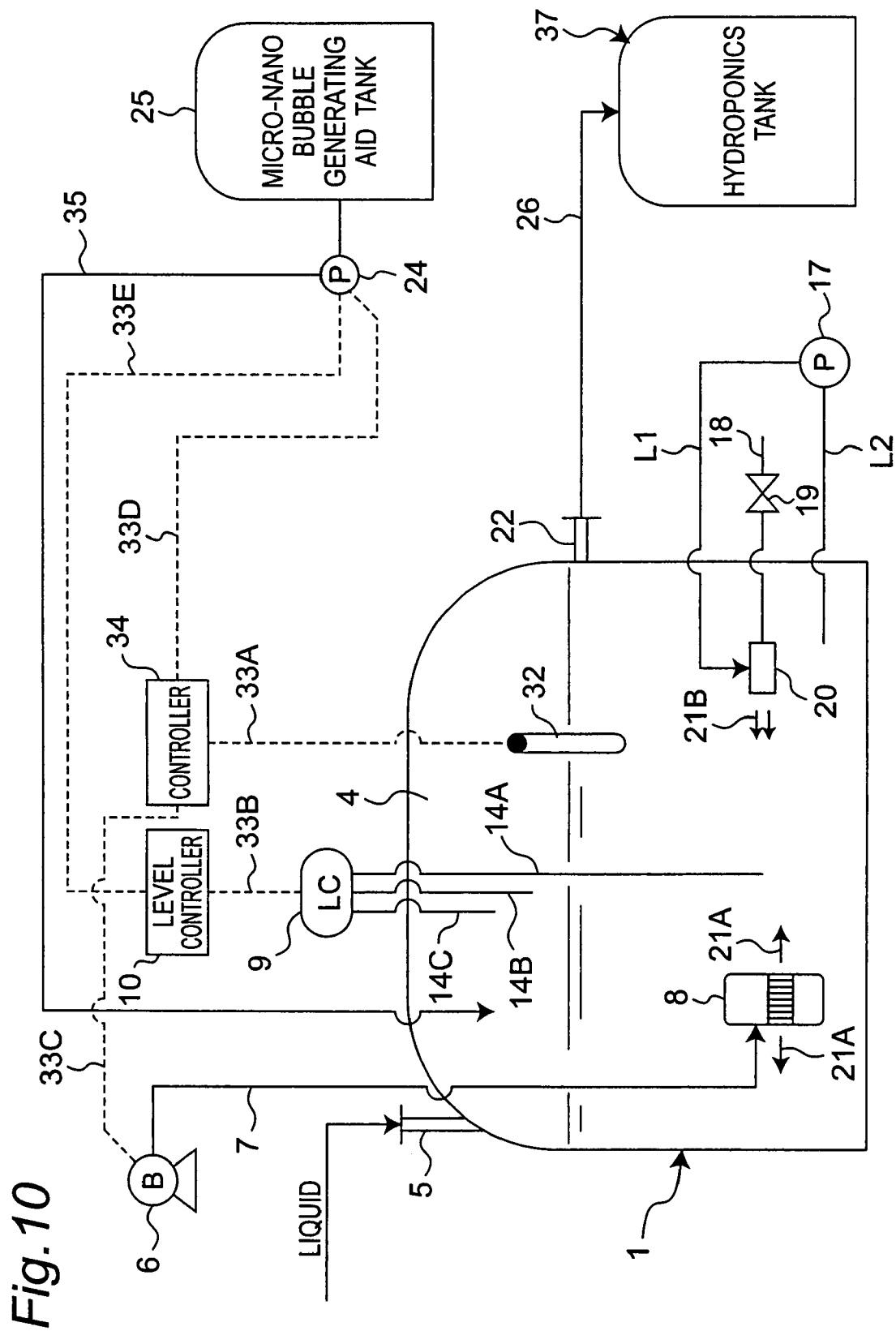
FIG. 10 is a schematic view showing a tenth embodiment of an application device for liquid containing micro-nano bubbles in the present invention.

Next, FIG. 10 shows an application device for liquid containing micro-nano bubbles which is a tenth embodiment of the present invention. The tenth embodiment is different from the first embodiment in the point that the next process device 27 in the above-mentioned first embodiment is replaced with a more specific hydroponics tank 37 in vegetable cultivation. Therefore, in this tenth embodiment, component members identical to those in the first embodiment are designated by identical reference numerals, and description will mainly be given of the portions different from the first embodiment.

Since the next process device 27 in the first embodiment is replaced with the hydroponics tank 37 in the tenth embodiment, a large amount of micro-nano bubbles contained in the liquid introduced into the hydroponics tank 37 from the micro-nano bubble generation tank 1 increase dissolved oxygen concentration in water to enhance the growth of vegetable roots. In the tenth embodiment, the micro-nano bubbles are effective for disinfecting water culture media, which prevents pathogenic bacteria attributed to viruses from being generated in vegetable hydroponics.

Eleventh Embodiment

Figure 11:
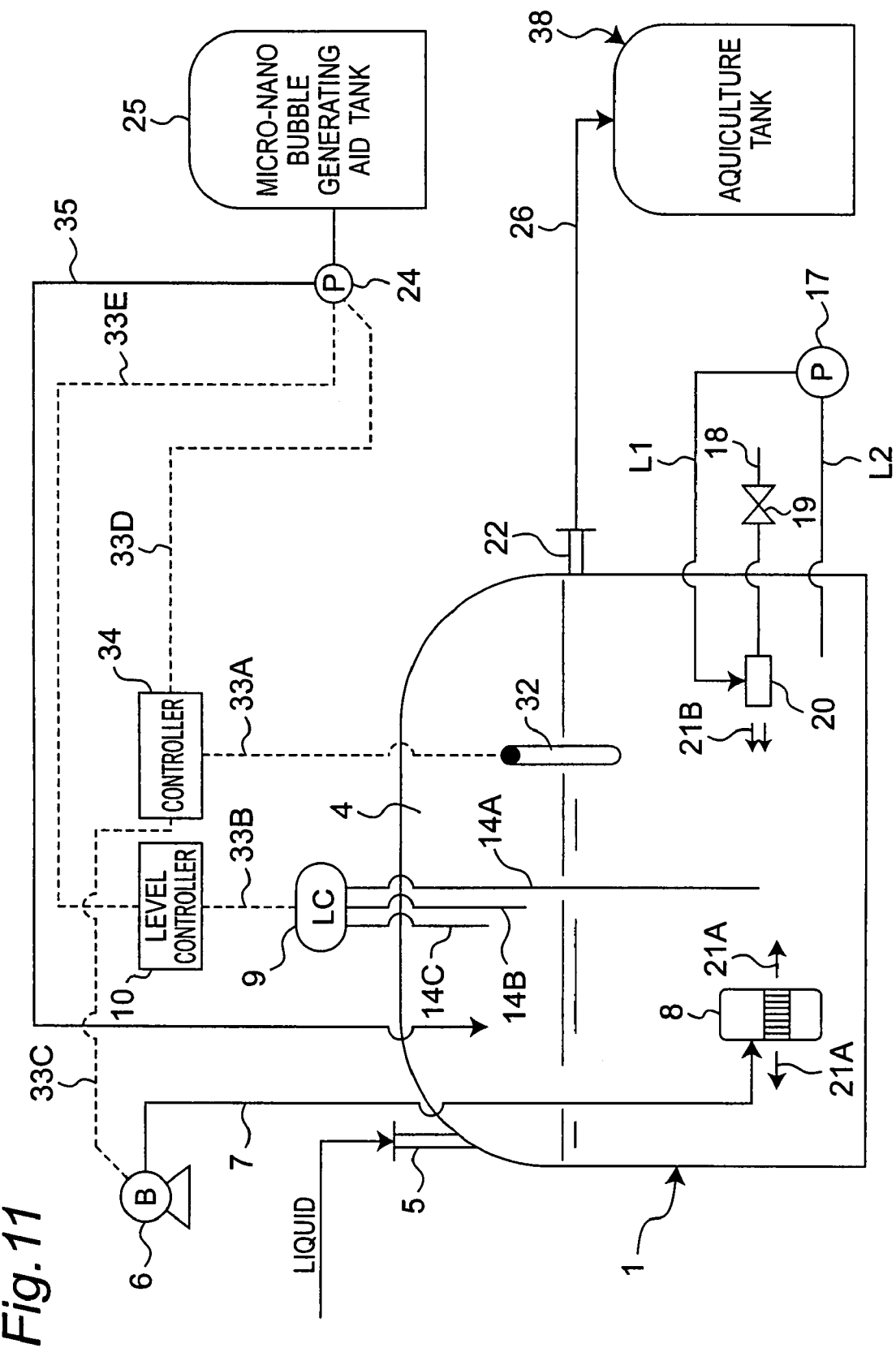
FIG. 11 is a schematic view showing an eleventh embodiment of an application device for liquid containing micro-nano bubbles in the present invention.

Next, FIG. 11 shows an application device for liquid containing micro-nano bubbles which is an eleventh embodiment of the present invention. The eleventh embodiment is different from the first embodiment in the point that the next process device 27 in the above-mentioned first embodiment is replaced with a more specific hydroponics tank aquiculture tank 38 in aquiculture. Therefore, in this eleventh embodiment, component members identical to those in the first embodiment are designated by identical reference numerals, and description will mainly be given of the portions different from the first embodiment.

Since the next process device 27 in the first embodiment is replaced with the aquiculture tank 38 in the eleventh embodiment, a large amount of micro-nano bubbles introduced into the aquiculture tank 38 from the micro-nano bubble generation tank 1 increase dissolved oxygen concentration in water to enhance the growth of fishes, shellfishes and crustaceans as target living beings in aquiculture. Moreover, the micro-nano bubbles are effective for disinfecting rearing water, which prevents pathogenic bacteria attributed to viruses from being generated in aquiculture.

Twelfth Embodiment

Figure 12:
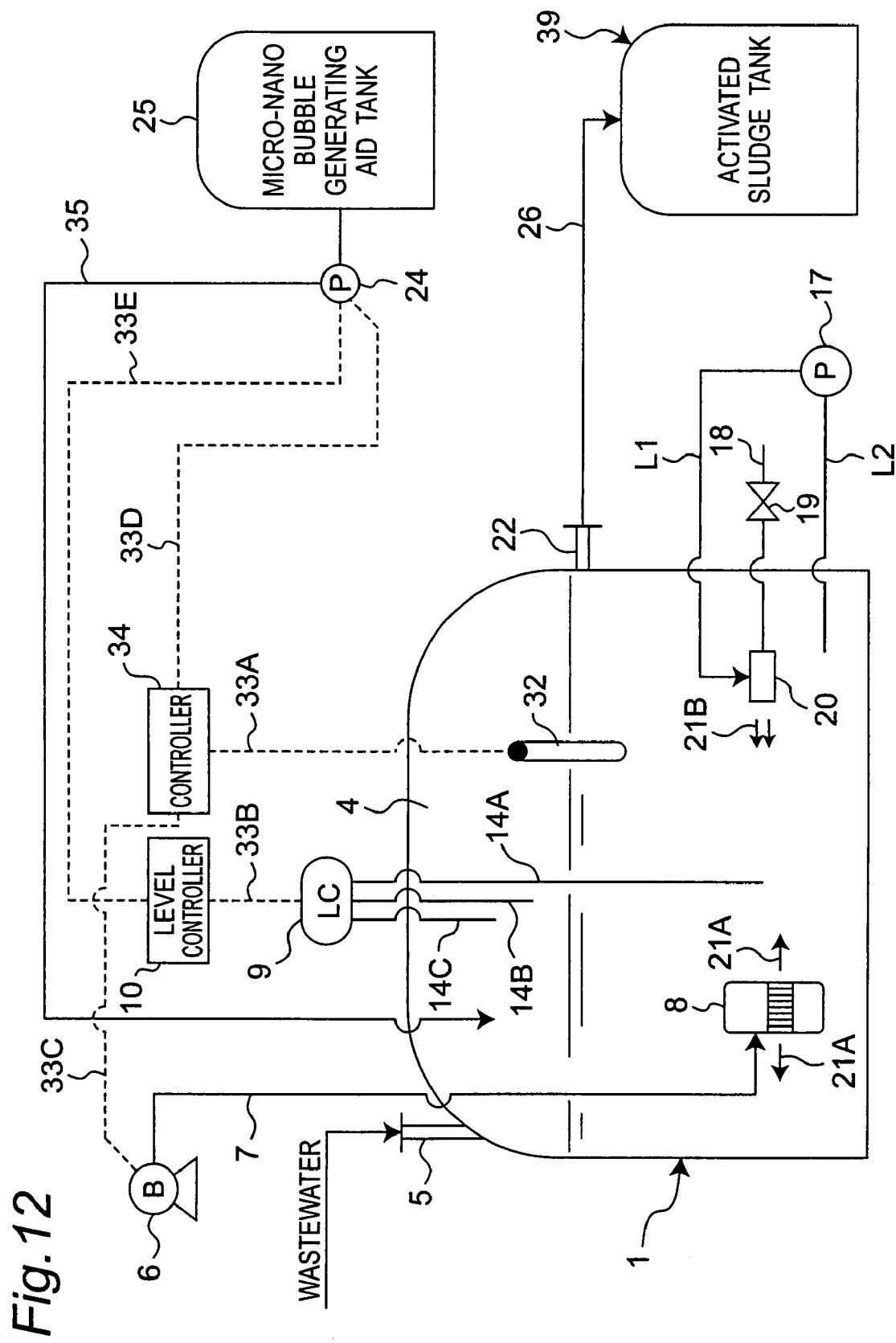
FIG. 12 is a schematic view showing a twelfth embodiment of an application device for liquid containing micro-nano bubbles in the present invention.

Next, FIG. 12 shows an application device for liquid containing micro-nano bubbles which is a twelfth embodiment of the present invention.

The twelfth embodiment is different from the first embodiment in the point that the next process device 27 in the above-mentioned first embodiment is replaced with a more specific activated sludge tank 39 in wastewater treatment. Therefore, in this twelfth embodiment, component members identical to those in the first embodiment are designated by identical reference numerals, and description will mainly be given of the portions different from the first embodiment.

Since the next process device 27 is replaced with the activated sludge tank 39 in the twelfth embodiment, microorganisms are activated by a large amount of micro-nano bubbles contained in the liquid introduced into the activated sludge tank 39 from the micro-nano bubble generation tank 1, so that the microorganism activity in the activated sludge tank 39 in wastewater treatment can be enhanced and the wastewater treatment efficiency can be enhanced.

Thirteenth Embodiment

Figure 13:
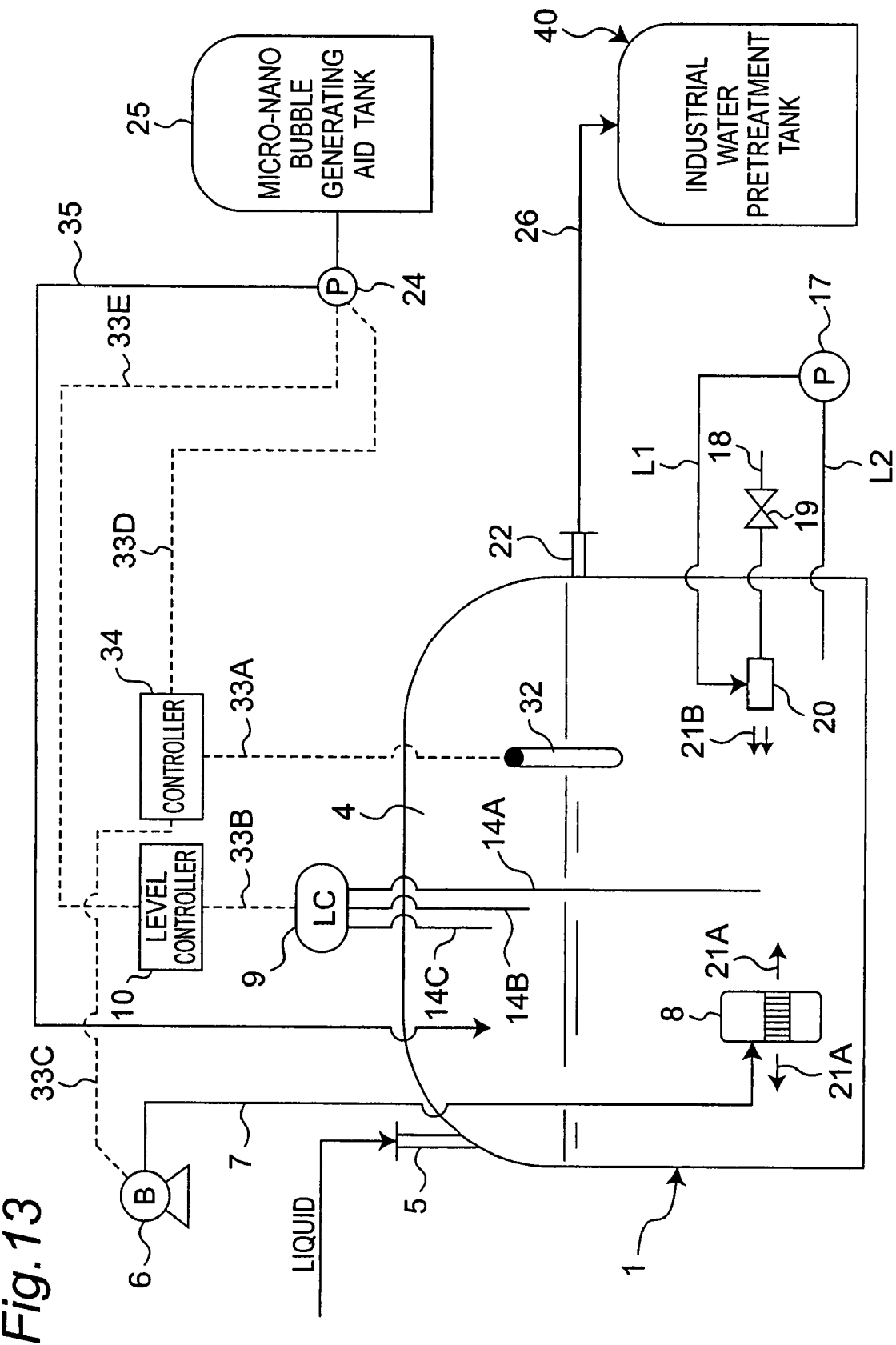
FIG. 13 is a schematic view showing a thirteenth embodiment of an application device for liquid containing micro-nano bubbles in the present invention.

Next, FIG. 13 shows an application device for liquid containing micro-nano bubbles which is a thirteenth embodiment of the present invention.

The thirteenth embodiment is different from the first embodiment in the point that the next process device 27 in the above-mentioned first embodiment is replaced with a more specific industrial water pretreatment tank 40. Therefore, in this thirteenth embodiment, component members identical to those in the first embodiment are designated by identical reference numerals, and description will mainly be given of the portions different from the first embodiment.

Since the next process device 27 in the first embodiment is replaced with the industrial water pretreatment tank 40 in the thirteenth embodiment, the activity of microorganisms can be enhanced by a large amount of micro-nano bubbles contained in the liquid introduced into the industrial water pretreatment tank 40 from the micro-nano bubble generation tank 1. This is effective for treatment of organic matter in industrial water, and therefore this system is particularly effective when the concentration of organic matter in industrial raw water is high.

Fourteenth Embodiment

Figure 14:
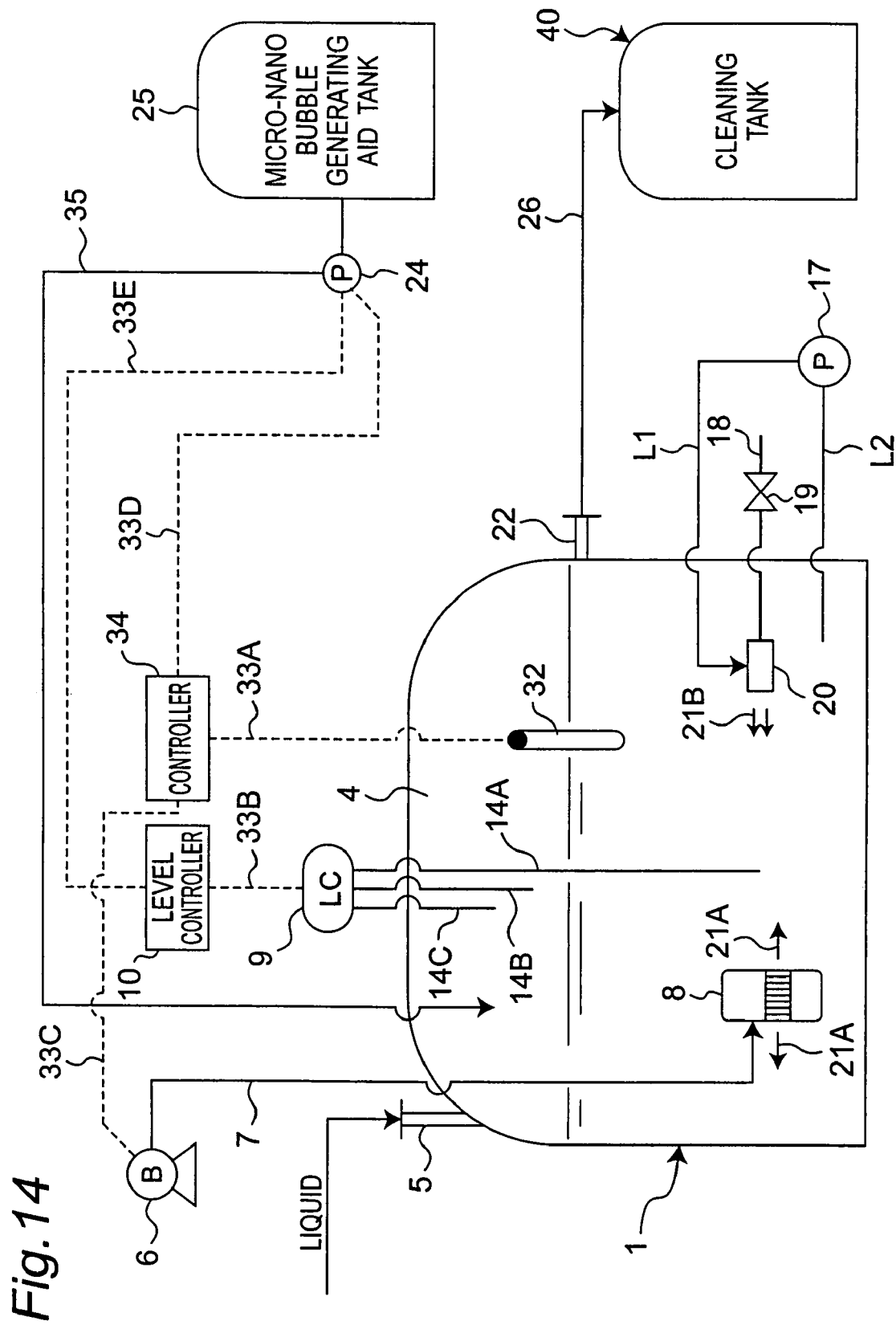
FIG. 14 is a schematic view showing a fourteenth embodiment of an application device for liquid containing micro-nano bubbles in the present invention.

Next, FIG. 14 shows an application device for liquid containing micro-nano bubbles which is a fourteenth embodiment of the present invention. The fourteenth embodiment is different from the first embodiment in the point that the next process device 27 in the above-mentioned first embodiment is replaced with a more specific cleaning tank 41. Therefore, in this fourteenth embodiment, component members identical to those in the first embodiment are designated by identical reference numerals, and description will mainly be given of the portions different from the first embodiment.

Since the next process device 27 in the first embodiment is replaced with the cleaning tank 41 in the fourteenth embodiment, a large amount of micro-nano bubbles contained in the liquid introduced into the cleaning tank 41 from the micro-nano bubble generation tank 1 can increase the cleaning effect in the cleaning tank 41, and thereby cleaning subjects can be cleaned more effectively. Therefore, according to the fourteenth embodiment, this system is particularly effective in the process requiring high level cleaning.

Fifteenth Embodiment

Figure 15:
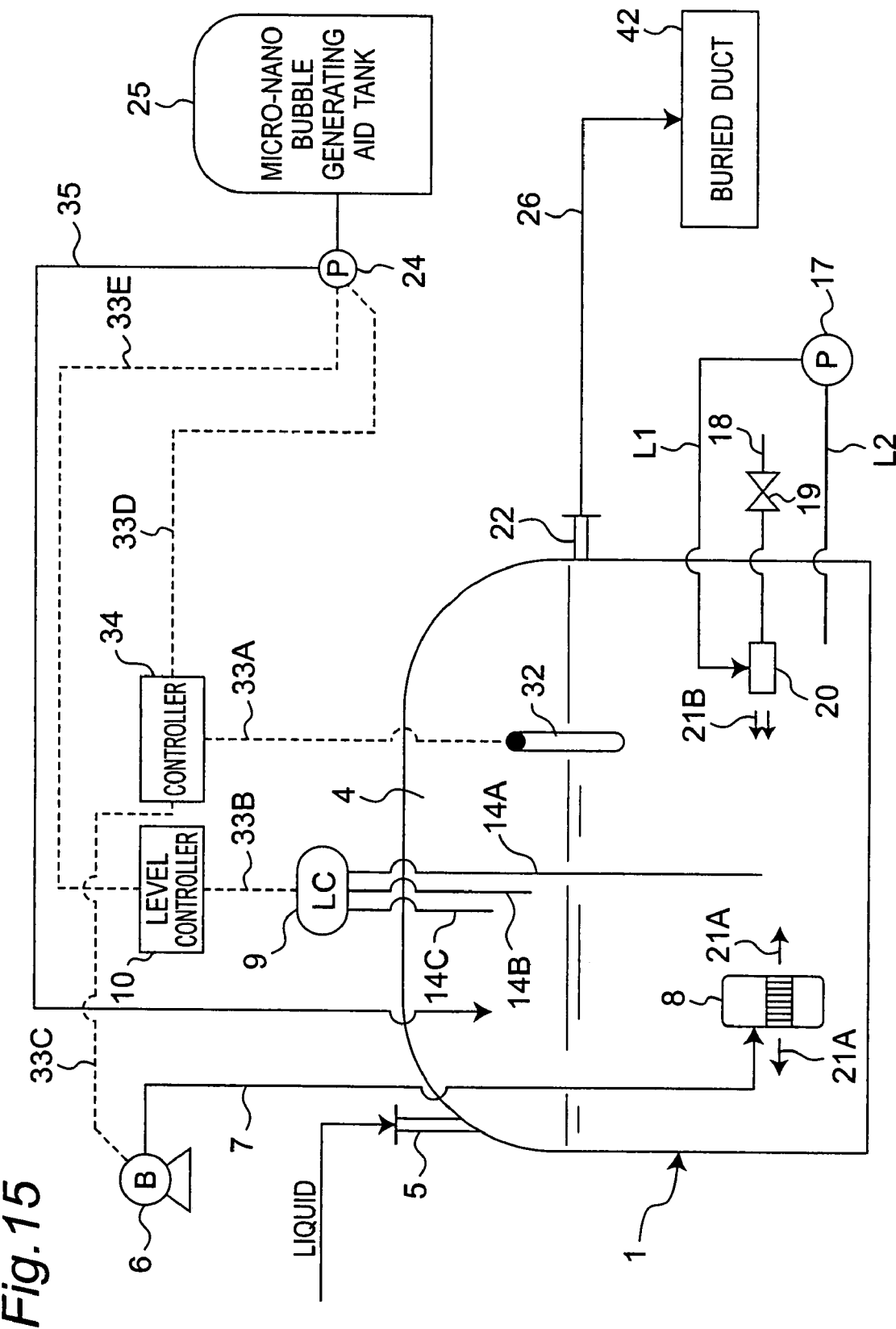
FIG. 15 is a schematic view showing a fifteenth embodiment of an application device for liquid containing micro-nano bubbles in the present invention.

Next, FIG. 15 shows an application device for liquid containing micro-nano bubbles which is a fifteenth embodiment of the present invention. The fifteenth embodiment is different from the first embodiment in the point that the next process device 27 in the above-mentioned first embodiment is replaced with a more specific buried duct 42. Therefore, in this fifteenth embodiment, component members identical to those in the first embodiment are designated by identical reference numerals, and description will mainly be given of the portions different from the first embodiment.

Since the next process device 27 in the first embodiment is replaced with the buried duct 43 in the fifteenth embodiment, a large amount of micro-nano bubbles contained in the liquid introduced into the buried duct 43 from the micro-nano bubble generation tank 1 increase the cleaning effect in the buried duct 43, and cleaning of the buried duct 4 with the micro-nano bubbles becomes available on a constant basis. Therefore, according to the fifteenth embodiment, the buried duct 43 can constantly be cleaned and the maintenance cost can be reduced.

Sixteenth Embodiment

Figure 16:
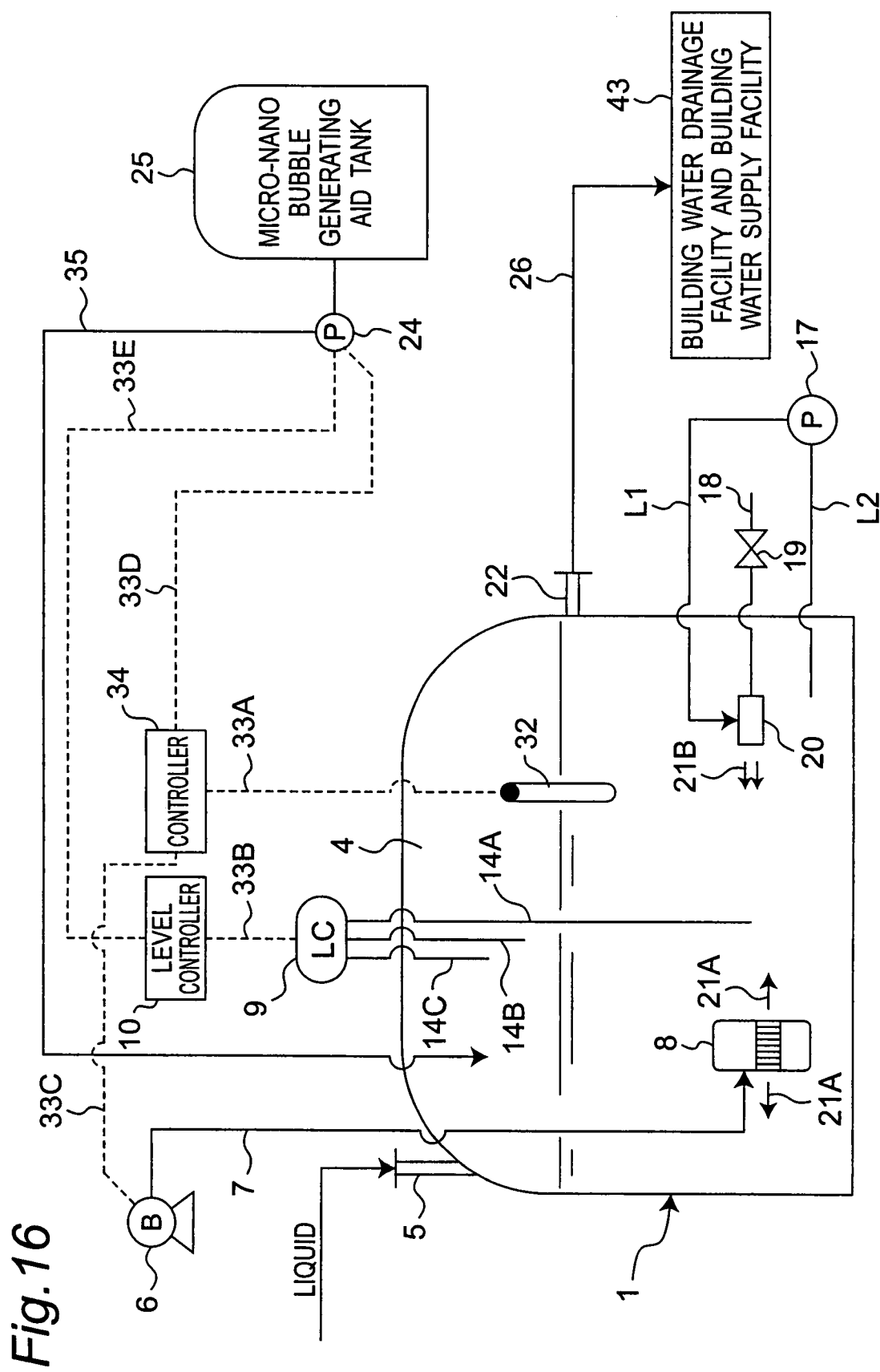
FIG. 16 is a schematic view showing a sixteenth embodiment of an application device for liquid containing micro-nano bubbles in the present invention.

Next, FIG. 16 shows an application device for liquid containing micro-nano bubbles which is a sixteenth embodiment of the present invention. In the sixteenth embodiment, the next process device 27 in the above-mentioned first embodiment is replaced with a more specific building water drainage facility and building water supply facility 43. Therefore, in this sixteenth embodiment, component members identical to those in the first embodiment are designated by identical reference numerals, and description will mainly be given of the portions different from the first embodiment.

In the sixteenth embodiment, the liquid containing a large amount of micro-nano bubbles from the micro-nano bubble generation tank 1 is introduced into building water drainage facility and building water supply facility 44. The liquid containing a large amount of micro-nano bubbles enhances the cleaning effect on the building water drainage facility and building water supply facility 44. Therefore, pipes can be cleaned effectively. Therefore, according to the sixteenth embodiment, maintenance costs including the cost of cleaning operation of the building water drainage facility and building water supply facility 44 can be reduced.

Experimental Example

An experimental device corresponding to the application device for liquid containing micro-nano bubbles in the twelfth embodiment shown in FIG. 12 was manufactured. In the experimental device, the capacity of the micro-nano bubble generation tank 1 was about 0.3 m³, the power of the submerged pump-type micro-nano bubble generator 8 was 0.75 kw, and the power of the circulating pump 17 of the non-submerged pump type (spiral flow type) micro-nano bubble generator 20 was 0.4 kw. Another experimental device in which the activated sludge tank 39 receives wastewater containing no micro-nano bubble was manufactured separately from the above experimental device.

Two lines of experiments were conducted for comparison: an experiment in which a large amount of micro-nano bubbles are added to the wastewater introduced into the activated sludge tank 39; and an experiment in which no micro-nano bubble is added to the wastewater introduced into the activated sludge tank 39.

After experiment operation for three months, the water quality of the treated water in the respective activated sludge tanks 39 was compared. As a result, in terms of biological oxygen demand, the value of the treated water treated in the activated sludge containing a large amount of micro-nano bubbles was approx. 40% lower than the value of the treated water treated in the activated sludge tank of the experimental device without micro-nano-bubbles.

Embodiments of the invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

The invention claimed is:

1. A manufacturing device for liquid containing micro-nano bubbles, comprising:
    a micro-nano bubble generation tank for receiving liquid, including a submerged pump-type micro-nano bubble generator, a non-submerged pump-type micro-nano bubble generator, a bubble level meter for detecting level of bubbles from a fluid level of the received liquid and a turbidimeter for detecting turbidity of the liquid;
    a micro-nano bubble generating aid metering pump for pumping a micro-nano bubble generating aid to the micro-nano bubble generation tank;
    a blower for supplying air to the submerged pump-type micro-nano bubble generator;
    a first control section for controlling the micro-nano bubble generating aid metering pump based on a bubble level detection signal obtained from the bubble level meter so as to control an amount of the micro-nano bubble generating aid introduced into the micro-nano bubble generation tank;
    a second control section for controlling the micro-nano bubble generating aid metering pump based on a turbidity detection signal obtained from the turbidimeter so as to control an amount of the micro-nano bubble generating aid introduced into the micro-nano bubble generation tank;
    a third control section for controlling the blower based on the turbidity detection signal obtained from the turbidimeter so as to control an amount of air supplied to the submerged pump-type micro-nano bubble generator.

2. An application device for liquid containing micro-nano bubbles, comprising:
    the manufacturing device for liquid containing micro-nano bubbles according to claim 1; and
    a next process device for receiving liquid containing micro-nano bubbles obtained from the manufacturing device for liquid containing micro-nano bubbles.

3. An application device for liquid containing micro-nano bubbles, comprising:
    the manufacturing device for liquid containing micro-nano bubbles according to claim 1; and
    a septic tank for receiving liquid containing micro-nano bubbles obtained from the manufacturing device for liquid containing micro-nano bubbles.

4. The application device for liquid containing micro-nano bubbles according to claim 2,
    wherein the next process device is a biological treatment device.

5. The application device for liquid containing micro-nano bubbles according to claim 2,
    wherein the next process device is a chemical treatment device.

6. The application device for liquid containing micro-nano bubbles according to claim 2,
    wherein the next process device is a physical treatment device.

7. The manufacturing device for liquid containing micro-nano bubbles according to claim 1,
    wherein the micro-nano bubble generation tank includes:
    a first micro-nano bubble generation section;
    a second micro-nano bubble generation section; and
    a divider plate for dividing the first micro-nano bubble generation section and the second micro-nano bubble generation section.

8. The manufacturing device for liquid containing micro-nano bubbles according to claim 7, comprising:
    a first micro-nano bubble generating aid metering pump for pumping a micro-nano bubble generating aid to the first micro-nano bubble generation section;
    a first bubble level meter for detecting level of bubbles in the first micro-nano bubble generation section;
    a first micro-nano bubble generating aid amount control section for controlling the micro-nano bubble generating aid metering pump based on a bubble level detection signal obtained from the first bubble level meter so as to control an amount of the micro-nano bubble generating aid introduced into the first micro-nano bubble generation section;
    a second micro-nano bubble generating aid metering pump for pumping a micro-nano bubble generating aid to the second micro-nano bubble generation section;
    a second bubble level meter for detecting level of bubbles in the second micro-nano bubble generation section; and
    a second micro-nano bubble generating aid amount control section for controlling the micro-nano bubble generating aid metering pump based on a bubble level detection signal obtained from the second bubble level meter so as to control an amount of the micro-nano bubble generating aid introduced into the second micro-nano bubble generation section.

9. An application device for liquid containing micro-nano bubbles, comprising:
    the manufacturing device for liquid containing micro-nano bubbles according to claim 1; and
    a useful microorganism tank for receiving liquid containing micro-nano bubbles obtained from the manufacturing device for liquid containing micro-nano bubbles.

10. An application device for liquid containing micro-nano bubbles, comprising:
    the manufacturing device for liquid containing micro-nano bubbles according to claim 1; and
    a fermentation tank for receiving liquid containing micro-nano bubbles obtained from the manufacturing device for liquid containing micro-nano bubbles.

11. An application device for liquid containing micro-nano bubbles, comprising:
the manufacturing device for liquid containing micro-nano bubbles according to claim 1; and
a hydroponics tank for receiving liquid containing micro-nano bubbles obtained from the manufacturing device for liquid containing micro-nano bubbles.

12. An application device for liquid containing micro-nano bubbles, comprising:
the manufacturing device for liquid containing micro-nano bubbles according to claim 1; and
an aquiculture tank for receiving liquid containing micro-nano bubbles obtained from the manufacturing device for liquid containing micro-nano bubbles.

13. An application device for liquid containing micro-nano bubbles, comprising:
the manufacturing device for liquid containing micro-nano bubbles according to claim 1; and
an activated sludge tank for receiving liquid containing micro-nano bubbles obtained from the manufacturing device for liquid containing micro-nano bubbles.

14. An application device for liquid containing micro-nano bubbles, comprising:
the manufacturing device for liquid containing micro-nano bubbles according to claim 1; and
an industrial water pretreatment tank for receiving liquid containing micro-nano bubbles obtained from the manufacturing device for liquid containing micro-nano bubbles.

15. An application device for liquid containing micro-nano bubbles, comprising:
the manufacturing device for liquid containing micro-nano bubbles according to claim 1; and
a cleaning tank for receiving liquid containing micro-nano bubbles obtained from the manufacturing device for liquid containing micro-nano bubbles.

16. The manufacturing device for liquid containing micro-nano bubbles according to claim 7,
wherein the submerged pump-type micro-nano bubble generator is placed in the first micro-nano bubble generation section, while the non-submerged pump-type micro-nano bubble generator is placed in the second micro-nano bubble generation section, and
wherein the first micro-nano bubble generation section is placed upstream from the second micro-nano bubble generation section.

17. The manufacturing device for liquid containing micro-nano bubbles according to claim 1,
wherein the micro-nano bubble generating aid is household detergent.

18. An application device for liquid containing micro-nano bubbles, comprising:
the manufacturing device for liquid containing micro-nano bubbles according to claim 1; and
a buried duct for receiving liquid containing micro-nano bubbles obtained from the manufacturing device for liquid containing micro-nano bubbles.

19. An application device for liquid containing micro-nano bubbles, comprising:
the manufacturing device for liquid containing micro-nano bubbles according to claim 1; and
a building water drainage facility and a building water supply facility for receiving liquid containing micro-nano bubbles obtained from the manufacturing device for liquid containing micro-nano bubbles.

* * * * *